(12) United States Patent
Yoshizawa

(10) Patent No.: US 9,519,742 B2
(45) Date of Patent: Dec. 13, 2016

(54) SUPPORT DEVICE, SEMICONDUCTOR DEVICE, AND NON-TRANSITORY COMPUTER READABLE MEDIUM

(71) Applicant: Renesas Electronics Corporation, Kawasaki-shi (JP)

(72) Inventor: Yutaka Yoshizawa, Kawasaki (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 0 days.

(21) Appl. No.: 14/518,941

(22) Filed: Oct. 20, 2014

(65) Prior Publication Data

US 2015/0135155 A1    May 14, 2015

(30) Foreign Application Priority Data

Nov. 13, 2013  (JP) ................................ 2013-234996

(51) Int. Cl.
*G06F 17/50* (2006.01)
*G01R 31/3185* (2006.01)

(52) U.S. Cl.
CPC ... *G06F 17/5054* (2013.01); *G01R 31/318536* (2013.01); *G01R 31/318555* (2013.01); *G06F 2217/86* (2013.01)

(58) Field of Classification Search
CPC ............. G06F 17/5054; G06F 2217/86; G01R 31/318536; G01R 31/318555
USPC ......................................... 716/117, 138, 139
See application file for complete search history.

(56) References Cited

U.S. PATENT DOCUMENTS

| | | | | |
|---|---|---|---|---|
| 3,723,864 A | * | 3/1973 | Ricard | G01R 27/16 324/522 |
| 4,289,975 A | * | 9/1981 | Rolfe | G01D 3/00 327/100 |
| 5,887,001 A | * | 3/1999 | Russell | G01R 31/2815 714/726 |
| 6,195,585 B1 | * | 2/2001 | Karunasiri | A61N 1/36032 607/57 |
| 6,226,322 B1 | * | 5/2001 | Mukherjee | H04B 3/145 333/28 R |
| 6,731,232 B1 | | 5/2004 | Kearney | |
| 6,889,348 B2 | * | 5/2005 | Sato | G01R 31/31813 324/762.01 |
| 6,938,248 B2 | * | 8/2005 | Kitakami | G06F 8/4432 717/141 |
| 6,985,098 B2 | * | 1/2006 | Lee | H03F 1/304 341/118 |
| 7,027,589 B2 | * | 4/2006 | Shi | H04B 3/46 379/26.01 |
| 7,123,671 B2 | * | 10/2006 | Mujica | H04L 27/2647 375/345 |

(Continued)

FOREIGN PATENT DOCUMENTS

JP      2007-531408 A    11/2007
JP      2013-104827 A     5/2013

*Primary Examiner* — Helen Rossoshek
(74) *Attorney, Agent, or Firm* — McGinn IP Law Group, PLLC

(57) ABSTRACT

According to an embodiment, a semiconductor device switches circuit forms and circuit configurations of a plurality of analog functional circuits by rearranging a command execution order according to the command execution order set in advance irrespectively of a command execution order specified by a user and executing the commands.

20 Claims, 27 Drawing Sheets

(56) References Cited

U.S. PATENT DOCUMENTS

| | | | | |
|---|---|---|---|---|
| 7,173,987 B2* | 2/2007 | Nishio | | H04N 5/20 348/725 |
| 7,302,380 B2* | 11/2007 | Shibata | | G06F 17/5022 703/22 |
| 7,414,552 B2* | 8/2008 | Chou | | H03G 3/3084 341/118 |
| 7,492,847 B2* | 2/2009 | Chou | | H03M 1/1255 341/122 |
| 7,602,274 B2* | 10/2009 | Lee | | G06K 19/0723 340/10.2 |
| 8,010,722 B2* | 8/2011 | Guido | | H03K 5/082 341/110 |
| 8,176,225 B2* | 5/2012 | Guido | | F02D 41/26 341/110 |
| 8,200,874 B1* | 6/2012 | Wennekamp | | H03K 19/17736 710/240 |
| 8,711,023 B2* | 4/2014 | Guido | | F02D 35/027 341/122 |
| 8,739,109 B2* | 5/2014 | Shimizu | | G06F 17/5063 716/101 |
| 8,742,962 B2 | 6/2014 | Murakami et al. | | |
| 2005/0015805 A1* | 1/2005 | Iwamura | | H04B 3/54 725/79 |
| 2005/0283692 A1* | 12/2005 | Whetsel | | G01R 31/31859 714/726 |
| 2009/0198399 A1* | 8/2009 | Kubo | | B60L 11/1855 701/22 |
| 2011/0237953 A1* | 9/2011 | Olsson | | B06B 1/0207 600/459 |
| 2011/0255136 A1* | 10/2011 | Takahashi | | H04N 1/1938 358/412 |
| 2012/0026407 A1* | 2/2012 | Zhang | | H04B 1/0032 348/731 |
| 2012/0299652 A1* | 11/2012 | Lemonovich | | H03F 3/217 330/251 |
| 2013/0278059 A1* | 10/2013 | Liu | | G05F 1/577 307/31 |
| 2013/0344827 A1* | 12/2013 | Epifano | | H04B 1/0475 455/114.3 |
| 2014/0378191 A1* | 12/2014 | Hosoi | | H04M 1/03 455/575.1 |
| 2015/0193367 A1* | 7/2015 | Mitsuishi | | G06F 13/32 710/308 |

* cited by examiner

Fig. 6

SPI CONTROL REGISTER MAP

| ADDRESS | DATA (D7:D0) |
|---|---|
| 00h | CIRCUIT FORM CHANGE REGISTER 1 |
| 01h | CIRCUIT FORM CHANGE REGISTER 2 |
| 02h | UNDEFINED (FOR EXTENSION) |
| 03h | INPUT/OUTPUT SETTING REGISTER 1 |
| 04h | INPUT/OUTPUT SETTING REGISTER 2 |
| 05h | INPUT/OUTPUT SETTING REGISTER 3 |
| 06h | REGULATOR CONTROL REGISTER |
| 07h | DAC CONVERSION RANGE SETTING REGISTER |
| 08h | DAC SETTING REGISTER 1 |
| 09h | DAC SETTING REGISTER 2 |
| 0Ah | DAC SETTING REGISTER 3 |
| 0Bh | DAC SETTING REGISTER 4 |
| 0Ch | AMPLIFIER GAIN SETTING REGISTER 1 |
| 0Dh | AMPLIFIER GAIN SETTING REGISTER 2 |
| 0Eh | AMPLIFIER GAIN SETTING REGISTER 3 |
| 0Fh | AMPLIFIER OPERATION MODE SETTING REGISTER |
| 10h | GAIN AMPLIFIER GAIN SETTING REGISTER |
| 11h | POWER-ON SETTING REGISTER 1 |
| 12h | POWER-ON SETTING REGISTER 2 |
| 13h | SOFT RESET SETTING REGISTER |

| INPUT ADDRESS | WRITE FLAG | CONTROL ORDER ARITHMETIC EXPRESSION | INTEGRATION VALUE Sigma [n] | CONTROL ORDER VALUE Order [n] |
|---|---|---|---|---|
| 00h | F[0]=1 | Order[0]=F[0]*F[0] |  | 1 |
| 01h | F[1]=1 | Order[1]=Sigma[1]*F[1] | Sigma[1]=F[0]+F[1] | 2 |
| 02h | F[2]=0 | Order[2]=Sigma[2]*F[2] | Sigma[2]=Sigma[1]+F[2] | 0 |
| 03h | F[3]=1 | Order[3]=Sigma[3]*F[3] | Sigma[3]=Sigma[2]+F[3] | 3 |
| 04h | F[4]=0 | Order[4]=Sigma[4]*F[4] | Sigma[4]=Sigma[3]+F[4] | 0 |
| 05h | F[5]=0 | Order[5]=Sigma[5]*F[5] | Sigma[5]=Sigma[4]+F[5] | 0 |
| 06h | F[6]=0 | Order[6]=Sigma[6]*F[6] | Sigma[6]=Sigma[6]+F[5] | 0 |
| 07h | F[7]=0 | Order[7]=Sigma[7]*F[7] | Sigma[7]=Sigma[7]+F[6] | 0 |
| 08h | F[8]=0 | Order[8]=Sigma[8]*F[8] | Sigma[8]=Sigma[8]+F[7] | 0 |
| 09h | F[9]=0 | Order[9]=Sigma[9]*F[9] | Sigma[9]=Sigma[9]+F[8] | 0 |
| 0Ah | F[A]=0 | Order[A]=Sigma[A]*F[A] | Sigma[A]=Sigma[A]+F[9] | 0 |
| 0Bh | F[B]=0 | Order[B]=Sigma[B]*F[B] | Sigma[B]=Sigma[B]+F[A] | 0 |
| 0Ch | F[C]=1 | Order[C]=Sigma[C]*F[C] | Sigma[C]=Sigma[C]+F[B] | 4 |
| 0Dh | F[D]=0 | Order[D]=Sigma[D]*F[D] | Sigma[D]=Sigma[D]+F[C] | 0 |
| 0Eh | F[E]=0 | Order[E]=Sigma[E]*F[E] | Sigma[E]=Sigma[E]+F[D] | 0 |
| 0Fh | F[F]=1 | Order[F]=Sigma[F]*F[F] | Sigma[F]=Sigma[F]+F[E] | 5 |
| 10h | F[10]=0 | Order[10]=Sigma[10]*F[10] | Sigma[10]=Sigma[10]+F[F] | 0 |
| 11h | F[11]=1 | Order[11]=Sigma[11]*F[11] | Sigma[11]=Sigma[10]+F[11] | 6 |
| 12h | F[12]=0 | Order[12]=Sigma[12]*F[12] | Sigma[12]=Sigma[11]+F[12] | 0 |
| 13h | F[13]=0 | Order[13]=Sigma[13]*F[13] | Sigma[13]=Sigma[12]+F[13] | 0 |

Register List

Font 6 ▼  |  Register Reload

| ADDRESS | REGISTER NAME | ATTRI-BUTE | D7 | D6 | D5 | D4 | D3 | D2 | D1 | D0 | HEX |
|---|---|---|---|---|---|---|---|---|---|---|---|
| 00h | CONFIG1 | R/W | - | 113a | 113b | 113c | - | 123a | 123b | 123c | 22h |
|  |  |  | 0 | 0 | 1 | 0 | 0 | 0 | 1 | 0 |  |
| 01h | CONFIG2 | R/W | - | 143a | 143b | 143c | - | SW02 | SW01 | SW00 | 11h |
|  |  |  | 0 | 0 | 0 | 1 | 0 | 0 | 0 | 1 |  |
| 02h | RESERVED | R/W | - | 0 | 0 | 0 | - | 0 | 0 | 0 | 00h |
|  |  |  | 0 | 0 | 0 | 0 | 0 | 0 | 0 | 0 |  |
| 03h | MPX SETTING 1 | R/W | SW10[1:0] |  | SW11[1:0] |  | SW12[1:0] |  | SW13[1:0] |  | CCh |
|  |  |  | 1 | 1 | 0 | 0 | 1 | 1 | 0 | 0 |  |
| 04h | MPX SETTING 2 | R/W | - | SW114[2:0] |  |  | - | SW15[2:0] |  |  | 23h |
|  |  |  | 0 | 0 | 1 | 0 | 0 | 0 | 1 | 1 |  |
|  |  |  | - | SCE1[1:0] |  | - | SCE2 | D_AMP[2:0] |  |  |  |

23

Setting Reservation

| ADDRESS | REGISTER NAME | ATTRI-BUTE | D7 | D6 | D5 | D4 | D3 | D2 | D1 | D0 | HEX |
|---|---|---|---|---|---|---|---|---|---|---|---|
| 03h | MPX SETTING 1 | R/W | SW10[1:0] |  | SW11[1:0] |  | SW12[1:0] |  | SW13[1:0] |  | 99h |
|  |  |  | 1 | 0 | 0 | 1 | 1 | 0 | 0 | 1 |  |
| 06h | LDO OUTPUT VOLTAGE SETTING | R/W | - | - | - | - | VERF[3:0] |  |  |  | 05h |
|  |  |  | 0 | 0 | 0 | 0 | 0 | 1 | 0 | 1 |  |
| 01h | CONFIG2 | R/W | - | 143a | 143b | 143c | - | SW02 | SW01 | SW00 | 41h |
|  |  |  | 0 | 1 | 0 | 0 | 0 | 0 | 0 | 1 |  |

24

Fig. 22    SPI CONTROL REGISTER MAP

| ADDRESS | DATA (D7:D0) |
|---|---|
| 00h | CIRCUIT FORM CHANGE REGISTER 1 |
| 01h | CIRCUIT FORM CHANGE REGISTER 2 |
| 02h | UNDEFINED (FOR EXTENSION) |
| 03h | INPUT/OUTPUT SETTING REGISTER 1 |
| 04h | INPUT/OUTPUT SETTING REGISTER 2 |
| 05h | INPUT/OUTPUT SETTING REGISTER 3 |
| 06h | REGULATOR CONTROL REGISTER |
| 07h | DAC CONVERSION RANGE SETTING REGISTER |
| 08h | DAC SETTING REGISTER 1 |
| 09h | DAC SETTING REGISTER 2 |
| 0Ah | DAC SETTING REGISTER 3 |
| 0Bh | DAC SETTING REGISTER 4 |
| 0Ch | AMPLIFIER GAIN SETTING REGISTER 1 |
| 0Dh | AMPLIFIER GAIN SETTING REGISTER 2 |
| 0Eh | AMPLIFIER GAIN SETTING REGISTER 3 |
| 0Fh | AMPLIFIER OPERATION MODE SETTING REGISTER |
| 10h | GAIN AMPLIFIER GAIN SETTING REGISTER |
| 11h | POWER-ON SETTING REGISTER 1 |
| 12h | POWER-ON SETTING REGISTER 2 |
| 13h | SOFT RESET SETTING REGISTER |

IMMEDIATE CHANGE GROUP

SUPPORT DEVICE, SEMICONDUCTOR DEVICE, AND NON-TRANSITORY COMPUTER READABLE MEDIUM

CROSS-REFERENCE TO RELATED APPLICATIONS

This application is based upon and claims the benefit of priority from Japanese patent application No. 2013-234996, filed on Nov. 13, 2013, the disclosure of which is incorporated herein in its entirety by reference.

BACKGROUND

The present invention relates to a design support device, a semiconductor device and a non-transitory computer readable medium. For example, the present invention relates to a semiconductor device which dynamically changes circuit configurations, a design support device which supports system design by using the semiconductor device, and a non-transitory computer readable medium.

In recent years, a programmable semiconductor device which programmably switches a circuit operating range or a circuit configuration has been proposed. Here, the Published Japanese Translation of PCT International Publication for Patent Application No. 2007-531408 and Japanese Unexamined Patent Application Publication No. 2013-104827 disclose examples of this programmable semiconductor device.

The Published Japanese Translation of PCT International Publication for Patent Application No. 2007-531408 discloses an analog/digital conversion circuit which can programmably switch an input voltage range. This analog/digital conversion circuit sets to which bit of a Cap DAC array an analog input signal is sampled based on data input inputted from a serial port.

Japanese Unexamined Patent Application Publication No. 2013-104827 discloses a semiconductor device which includes a plurality of analog functional circuits such as amplifiers, and switches circuit forms (e.g. an inverting circuit and a non-inverting circuit) and circuit configurations (e.g. a gain) using circuit configuration commands.

SUMMARY

There is no problem regarding the above programmable semiconductor device since, when the circuit forms are fixed and the circuit configurations are changed, only a resistance value on a current path and the like is switched. However, when the circuit forms are changed, for example, a direct current path which does not yet exist is formed in some cases. When such an unintended direct current path is formed, there is a concern that an unintended current may flow and thus the reliability of the semiconductor device will be reduced.

The other problems to be solved and novel features of the invention will become apparent from the following description and the attached drawings.

According to an embodiment of the present invention, a semiconductor device switches circuit forms and circuit configurations of a plurality of analog functional circuits by rearranging a command execution order according to a command execution order set in advance irrespectively of a command execution order specified by a user and executing commands.

In addition, the semiconductor device according to the above embodiment can be replaced by a method and a system. The method, the system and a program which can cause a computer to execute processing in the semiconductor device or part of the processing in the semiconductor device are effective aspects of the present invention.

According to the embodiment, it is possible to switch circuit forms and circuit configurations without taking into account a failure which occurs when the user switches the circuit forms and the circuit configurations.

BRIEF DESCRIPTION OF THE DRAWINGS

The above and other aspects, advantages and features of the present invention will be more apparent from the following description of certain embodiments thereof taken in conjunction with the accompanying drawings, in which:

FIG. 6 is a view for explaining a SPI control register map according to the first embodiment;

FIG. 9 is a view for explaining processing in an execution order computation circuit according to the first embodiment;

FIG. 16 is a view for explaining a register setting value check screen which is used in the design support device according to the third embodiment to check a setting status of circuit parameters;

FIG. 22 is a view of a SPI control register map for explaining an immediate change group according to the fifth embodiment;

DETAILED DESCRIPTION

Figure 1:
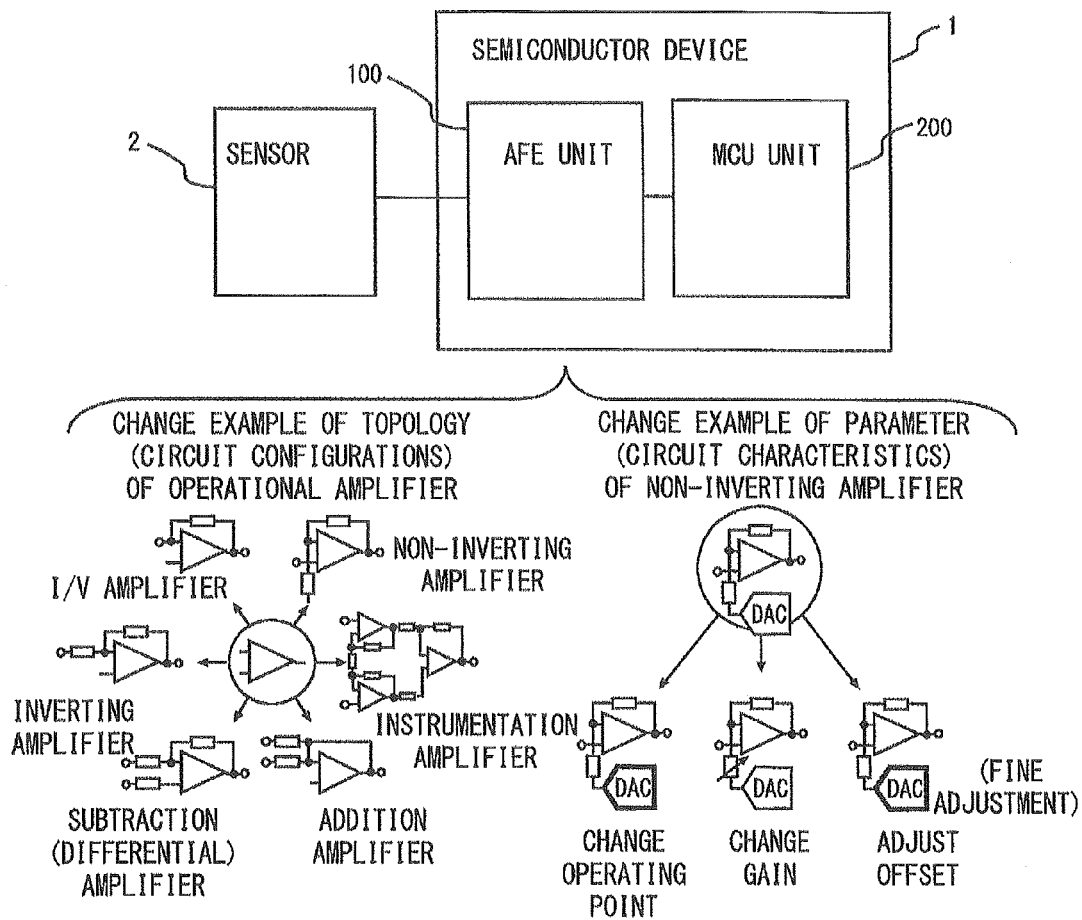
FIG. 1 is a configuration diagram of a sensor system according to a first embodiment.

The following description and drawings have been optionally omitted and simplified to clarify explanation. Further, elements disclosed as functional blocks which perform various processing shown in the drawings can be configured as a CPU, a memory or other circuits in terms of hardware, and can be realized as programs loaded to the memory in terms of software. Therefore, it should be understood by one of ordinary skill in the art that these functional blocks are realized in various forms by hardware alone, software alone or a combination of these, and are not limited to one of these. Note that like elements are designated by identical reference numerals throughout the drawings, and the description thereof is omitted as necessary.

Further, the above programs are stored using various types of non-transitory computer readable media and can be supplied to a computer. The non-transitory computer readable media include various types of tangible storage media. The non-transitory computer readable media include, for example, magnetic storage media, (e.g. a flexible disk, a magnetic tape and a hard disk drive), a magneto optical storage medium (e.g. a magneto optical disk), a CD-ROM (Read Only Memory), a CD-R, a CD-R/W, and semiconductor memories (e.g. a mask ROM, a PROM (Programmable ROM), an EPROM (Erasable PROM), a flash ROM, and a RAM (Random Access Memory)). Further, the programs may be supplied to the computer by various types of transitory computer readable media. The transitory computer readable media include, for example, an electrical signal, an optical signal and an electromagnetic wave. The transitory computer readable media can supply programs to computers through a wired communication channel such as wires and optical fibers or a wireless communication channel.

First Embodiment

Embodiments will be described below with reference to the drawings. A configuration and a method of changing circuit forms and circuit configurations in a semiconductor device whose circuit forms and circuit configurations can be changed in the present embodiment will be described. In addition, in the following description, the analog front end unit has analog functional circuits realize other functions by changing the circuit forms, or switches circuit characteristics of the analog functional circuits by switching input/output signals and changing the circuit configurations.

The semiconductor device according to the present embodiment will be first described to help understanding thereof. FIG. 1 illustrates a configuration of a sensor system including the semiconductor device according to the present embodiment.

As illustrated in FIG. 1, this sensor system has a sensor 2 and a semiconductor device 1 connected to the sensor.

As the sensor 2, various sensors such as a current output sensor which outputs a current matching a detection result, a voltage output sensor which outputs a voltage matching a detection result, and a sensor which outputs a weak differential signal according to a detection result can be used.

The semiconductor device 1 has a processing unit (e.g. MCU unit 200) and an analog front end unit (e.g. AFE unit 100). For example, the semiconductor device 1 is a SoC (System-on-a-chip) in which a semiconductor chip of the MCU unit 200 and a semiconductor chip of the AFE unit 100 are mounted on one semiconductor device. In addition, the semiconductor device 1 may be a semiconductor device of one chip including the MCU unit 200 and the AFE unit 100. Further, a semiconductor device including only the MCU unit 200 and a semiconductor device including only the AFE unit 100 may be used. Hereinafter, a device including the AFE unit 100 and the MCU unit 200 is referred to as the semiconductor device 1 in some cases, while a device including only the AFE unit 100 is referred to as the semiconductor device 1 in some other cases.

The MCU unit (processing unit) 200 is a microcontroller which A/D converts a measurement signal (detection signal) of the sensor 2 inputted through the AFE unit 100, and performs control processing matching a detection signal. Further, the MCU unit 200 outputs circuit change commands for changing circuit forms and circuit configurations in the AFE unit 100, to the AFE unit 100.

The AFE unit (analog input unit) 100 is an analog circuit which performs analog front end processing such as amplification or filtering of a measurement signal outputted from the sensor 2, and converts the measurement signal into a signal which can be processed by the MCU unit 200. Further, as illustrated in FIG. 1, the AFE unit 100 can change a topology (circuit forms and circuit configurations), and can also change further parameters (circuit characteristics).

As illustrated in an example in FIG. 1, a configuration of an operational amplifier circuit can be changed to a configuration of an I/V amplifier, a subtraction (differential) amplifier, an addition amplifier, an inverting amplifier, a non-inverting amplifier or an instrumentation amplifier. Further, it is possible to change an operating point, change a gain and adjust an offset as in a parameter example of the non-inverting amplifier.

Figure 2:
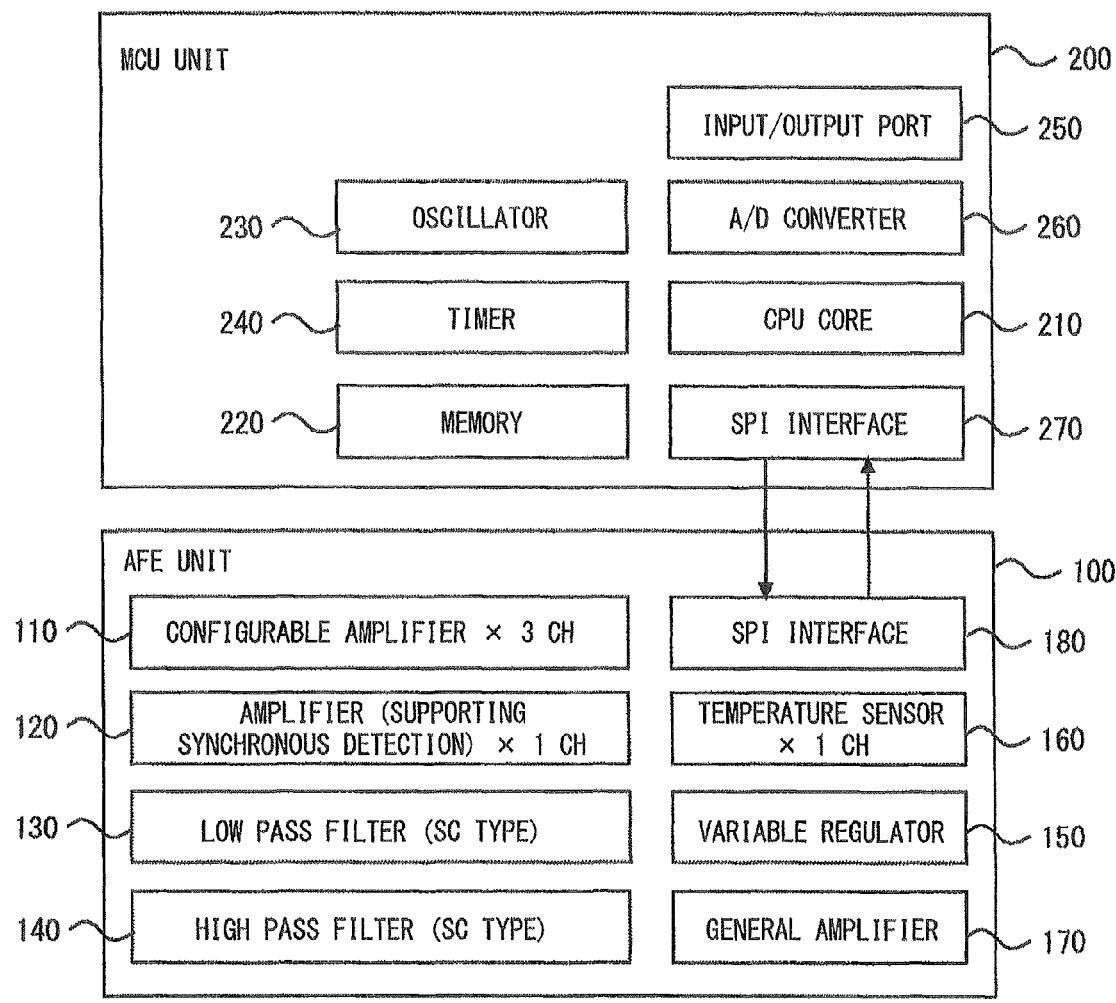
FIG. 2 is a block diagram of a semiconductor device according to the first embodiment.

FIG. 2 illustrates a circuit block of the semiconductor device 1. As illustrated in FIG. 2, the MCU unit 200 has a CPU core 210, a memory 220, an oscillator 230, a timer 240, an input/output port 250, an A/D converter 260 and a communication interface (e.g. SPI (Serial Peripheral Interface) interface 270). In addition, the MCU 200 has other circuits which realize functions of the microcontroller such as a DAM and various computation circuits.

The CPU core 210 executes programs stored in the memory 220, and performs control processing according to the programs. The memory 220 stores programs executed by the CPU core 210, and various items of data. The memory 220 stores as one of various items of data a plurality of commands for specifying circuit forms and circuit configurations of circuits configured to include a plurality of analog functional circuits included in the AFE unit 100. The oscillator 230 generates operation clocks of the MCU unit 200, and supplies the clocks to the AFE unit 100 when necessary. The timer 240 is used for an operation of controlling the MCU unit 200.

The input/output port 250 is an interface which inputs and outputs data or the like to and from a device outside the semiconductor device 1, and can be connected with, for example, an external computer device as described below.

The A/D converter 260 A/D converts the measurement signal of the sensor 2 inputted through the AFE unit 100. Further, a power source of the A/D converter 260 is supplied from the AFE unit 100.

The SPI (Serial Peripheral Interface) interface 270 is an interface which inputs and outputs data or the like to and from the AFE unit 100. In addition, the SPI interface 270 is a general serial interface, and, as long as a microcontroller/microcomputer supports a SPI, another microcontroller/microcomputer can be connected with the AFE unit 100.

The semiconductor device 1 in FIG. 2 is configured to support general use. More specifically, a set of a sensor AFE circuits is mounted on the semiconductor device 1 to enable connection of sensors of various types and characteristics. That is, the AFE unit 100 has a configurable amplifier 110, a synchronous detection supporting amplifier (also referred to as an amplifier) 120, a SC type low pass filter (also referred to as a low pass filter) 130, a SC type high pass filter (also referred to as a high pass filter) 140, a variable regulator 150, a temperature sensor 160, a general amplifier 170 and a SPI interface 180.

The configurable amplifier 110 is an amplification circuit which amplifies a signal inputted from outside, such as from the sensor 2, and a circuit form, characteristics and an operation of the configurable amplifier 110 can be set under control of the MCU unit 200 (e.g. a command transmitted from the MCU unit 200). The configurable amplifier 110 has 3 ch amplifiers, i.e., three amplifiers. These three amplifiers can realize multiple circuit configurations.

The amplifier 120 is an amplification circuit which supports synchronous detection and amplifies an output of the configurable amplifier 110 and a signal inputted from outside, such as from the sensor 2, and characteristics and an operation of the amplifier 120 can be set under control of the MCU unit 200.

The low pass filter 130 is a SC type filter which removes high frequency components of outputs of the configurable amplifier 110 and the amplifier 120 and a signal inputted from outside, such as from the sensor 2 and allows low frequency components of the outputs and the signal to pass, and characteristics and an operation of the low pass filter 130 can be set under control of the MCU unit 200. The high pass filter 140 is a SC type filter which removes low frequency components of outputs of the configurable amplifier 110 and the amplifier 120 and a signal inputted from outside such as from the sensor 2 and allows high frequency components of the outputs and the signal to pass, and characteristics and an operation of the high pass filter 140 can be set under control of the MCU unit 200.

The variable regulator 150 is a variable voltage source which supplies a voltage to the A/D converter 260 of the MCU unit 200, and characteristics and an operation of the variable regulator 150 can be set under control of the MCU unit 200. The temperature sensor 160 is a sensor which measures a temperature of the semiconductor device 1, and an operation of the temperature sensor 160 can be set under control of the MCU unit 200.

The general amplifier 170 is an amplifier which amplifies a signal inputted from outside, such as from the sensor 2, and an operation of the general amplifier 170 can be set under control of the MCU unit 200. The SPI interface 180 is an interface which inputs and outputs data and the like to and from the MCU unit 200, and is connected with the SPI interface 270 of the MCU unit 200 through a SPI bus. In addition, when the semiconductor device 1 does not have the MCU unit 200, the SPI interface 180 is connected to an external terminal of the semiconductor device 1, and the AFE unit 100 is connected with, for example, an external microcomputer or emulator through the external terminal.

Figure 3:
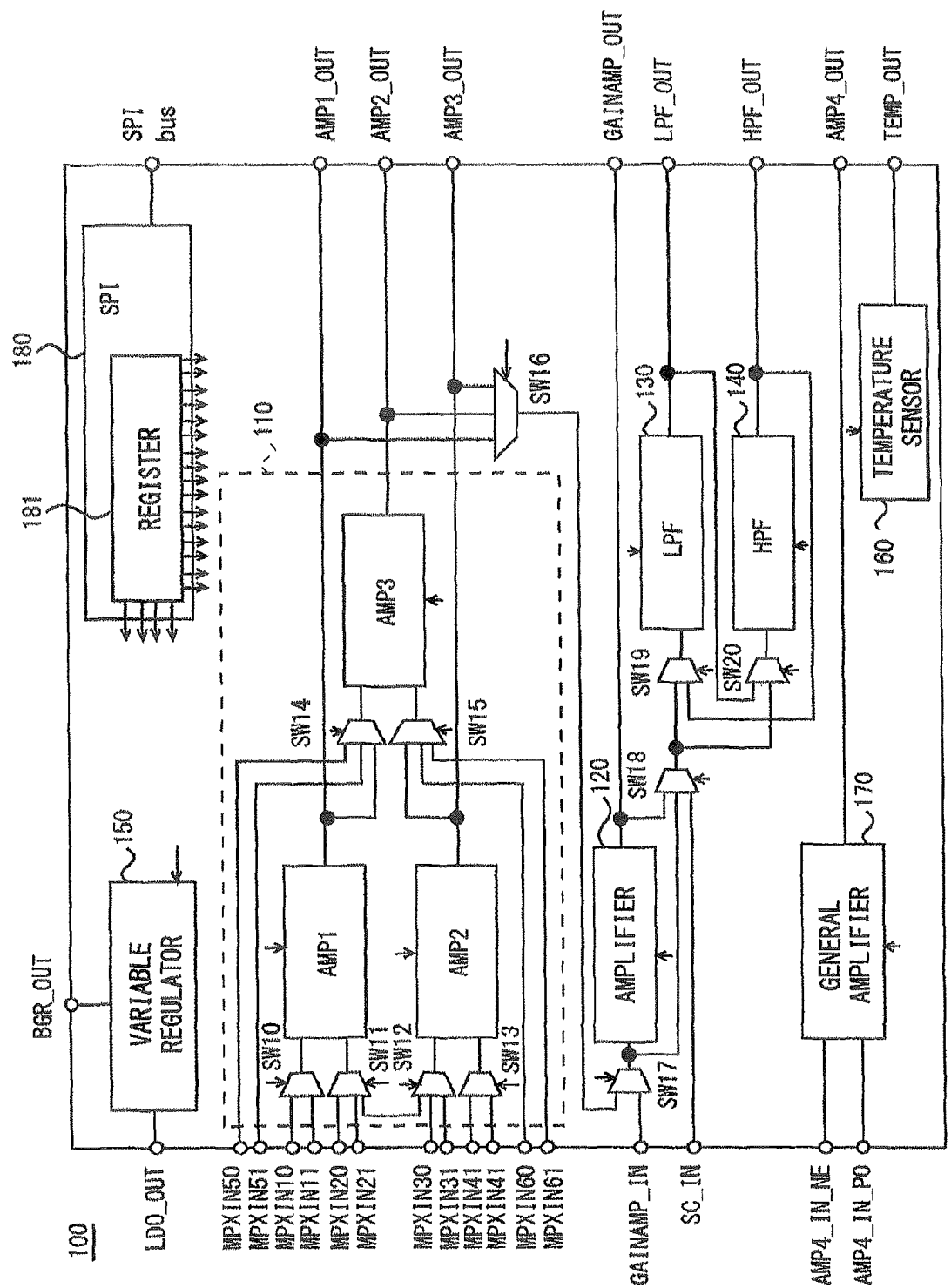
FIG. 3 is a view illustrating a connection relationship of circuits of the semiconductor device according to the first embodiment.

Next, a configuration of the AFE unit 100 in the semiconductor device 1 will be described in detail. FIG. 3 illustrates a connection relationship of each circuit in the AFE unit 100. The AFE unit 100 includes a plurality of analog circuit elements (e.g. amplifiers, resistors and a capacitor) and a switch circuit group (e.g. a switch circuit including switches and multiplexers) which switches connection states between a plurality of analog circuit elements.

The SPI interface 180 is connected to external terminals (CS, SCLK, SDO and SDI) connected to a SPI bus, and includes a register (SPI control register) 181. Configuration information (commands) for changing circuit configurations and characteristics is inputted from the MCU unit 200 through the SPI interface, and is stored in the SPI control register 181. The register 181 is connected to each circuit in the AFE unit 100, and a configuration and characteristics of each circuit in the AFE unit 100 are set according to the configuration information of the SPI control register 181.

The configurable amplifier 110 has individual amplifiers AMP 1, AMP 2 and AMP 3, and is connected with switches SW 10 to SW 15 which switch amplifier inputs and outputs.

The individual amplifier AMP 1 has one input terminal connected to MPXIN 10 or MPXIN 11 through the switch SW 10, the other input terminal connected to MPXIN 20 or MPXIN 21 through the switch SW 11, and an output terminal connected to AMP1_OUT. Similarly, the individual amplifier AMP 2 has one input terminal connected to MPXIN 30 or MPXIN 31 through the switch SW 12, the other input terminal connected to MPXIN 40 or MPXIN 41 through the switch SW 13, and an output terminal connected to AMP2_OUT.

Further, the individual amplifier AMP 3 has one input terminal connected to MPXIN 50, MPXIN 51 or the output terminal of the AMP 1 through the switch SW 14, the other input terminal connected to MPXIN 60, MPXIN 61 or the output terminal of the AMP 2 through the switch SW 15, and an output terminal connected to AMP3_OUT. The output terminals of the AMP 1 to the AMP 3 are also connected to the amplifier 120, the low pass filter 130 and the high pass filter 140.

In the configurable amplifier 110, the switches SW 10 to SW 15 are switched according to setting values of the SPI control register 181, and connection configurations of the AMP 1 to AMP 3 are changed and internal circuit forms and characteristics are changed as described below.

Further, as illustrated in FIG. 3, the amplifier 120 is connected with switches SW 16 and 17 which switch inputs. The amplifier 120 has an input terminal connected to the output terminals of AMP 1 to AMP 3 through the switches SW 16 and SW 17 or GAINAMP_IN through the switch SW 17, and an output terminal connected to GAINAMP_OUT. The output terminal of the amplifier 120 is also connected to the low pass filter 130 and the high pass filter 140. In addition, the SW 16 may switch connection between the output terminals of the AMP 1 to the AMP 3, the external terminals and the amplifier.

The low pass filter 130 is connected with switches SW 18 and SW 19 which switch inputs, and the high pass filter 140 is also connected with switches SW 18 and SW 20 which switch inputs. The low pass filter 130 has an input terminal connected to the output terminals of the AMP 1 to AMP 3, the output terminal of the amplifier 120 or SC_IN through the switches SW 16, SW 17, SW 18 and SW 19, or the output terminal of the high pass filter 140 through the switch SW 19, and an output terminal connected to LPF_OUT. The high pass filter 140 has an input terminal connected to the output terminals of the AMP 1 to AMP 3, the output terminal of the amplifier 120 or SC_IN through the switches SW 16, SW 17, SW 18 and SW 20, or the output terminal of the low pass filter 130 through the switch SW 19, and an output terminal connected to HPF_OUT. In addition, a switch may be provided between the output terminals of the low pass filter 130 and the high pass filter 140 and the external terminals, and connection between the output terminals of the low pass filter 130 and the high pass filter 140, the external terminals and the SW 19 and the SW 20 may be switched.

The switches SW 16 to SW 20 are switched according to setting values of the SPI control register 181, a connection configuration of the amplifier 120, the low pass filter 130 and the high pass filter 140 is changed and internal characteristics are also changed as described below.

Further, as illustrated in FIG. 3, the variable regulator 150 has an output terminal connected to BGR_OUT and LDO_OUT. Characteristics of the variable regulator are changed according to a setting value of the SPI control register 181 as described below.

The temperature sensor 160 has an output terminal connected to TEMP_OUT. Characteristics of the temperature sensor 160 are changed according to a setting value of the SPI control register 181 as described below.

The general amplifier 170 has one input terminal connected to AMP4_IN_NE, the other input terminal connected to AMP4_IN_PO and an output terminal connected to AMP4_OUT. The general amplifier is configured as one operational amplifier, and on and off of a power source are set according to a setting value of the SPI control register 181.

Figure 4:
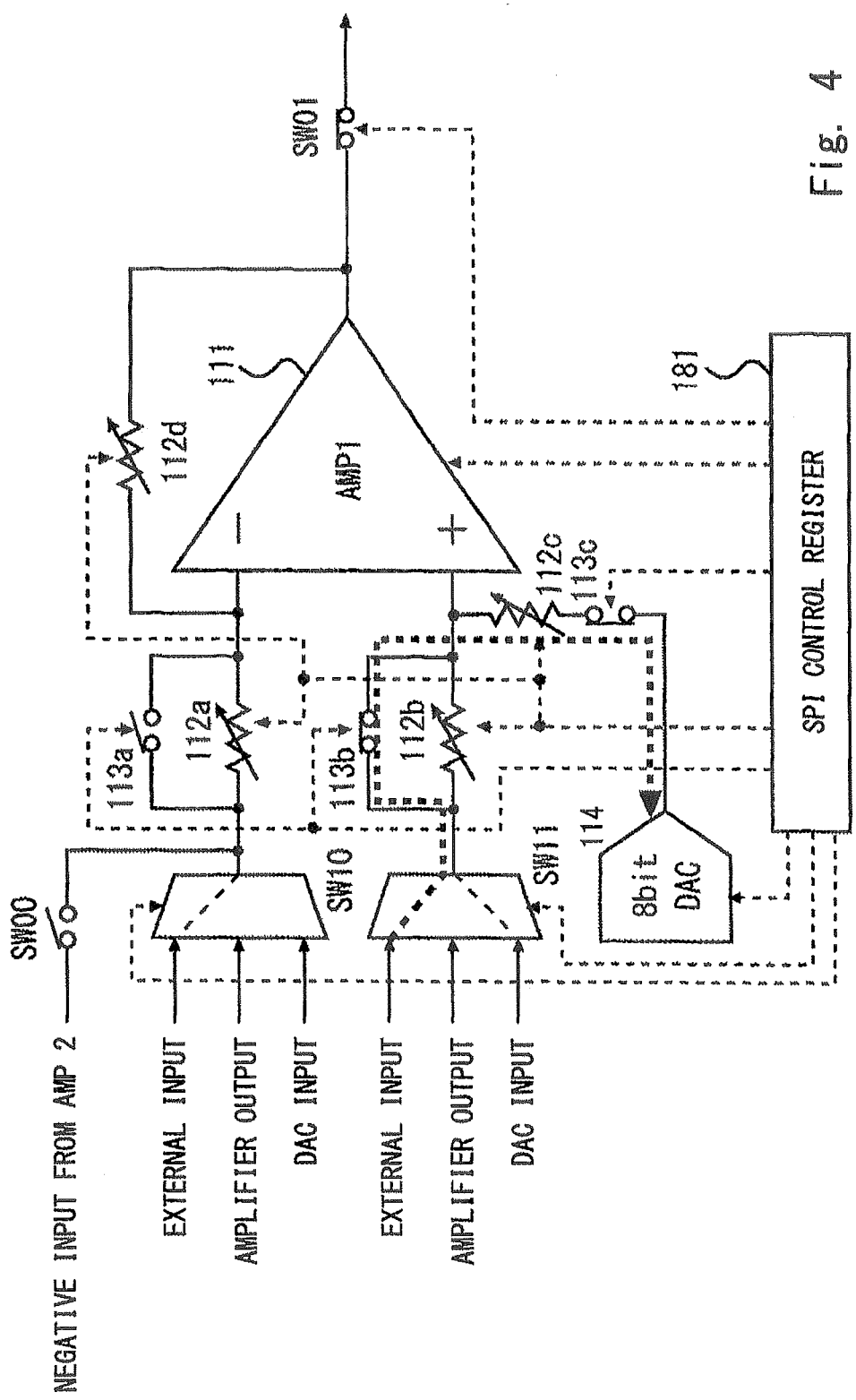
FIG. 4 is a circuit diagram illustrating one of a plurality of analog functional circuits of the semiconductor device according to the first embodiment.

Hereinafter, changing circuit forms and circuit configurations will be described using the individual amplifier AMP 1 of the configurable amplifier 110 as an example. FIG. 4 illustrates a circuit configuration of the individual amplifier AMP1 of the configurable amplifier 110. In addition, the AMP 2 and the AMP 3 also employ the same configurations.

As illustrated in FIG. 4, the individual amplifier AMP 1 has an operational amplifier 111, and each terminal of the operational amplifier 111 is connected to variable resistors 112a to 112d, circuit form control switches (e.g. switches 113a to 113c) and a DAC 114 and is also connected with multiplexers (switches) SW 10 and SW 11 as illustrated in FIG. 3.

According to setting values of the SPI control register 181, the multiplexers SW 10 and SW 11 switch an input of the operational amplifier 111, the switches 113a and 113b switch connection or disconnection of the variable resistors (input resistors) 112a and 112b, and the switch 113c can switch connection of the DAC 114. In addition, the switches SW 16, 17 and SW 18 switch connection between the output of the operational amplifier 111 and the amplifier 120, the low pass filter 130 and the high pass filter 140 as illustrated in FIG. 3. Further, it is possible to change a gain, an operating point and an offset of the AMP 1 by changing resistance values of the variable resistors 112a, 112b, 112c and 112d and a setting of the DAC 114 according to setting values of the SPI control register 181. Furthermore, on and off of a power source can be controlled according to a setting value of the SPI control register 181. Still further, it is possible to control a through rate by changing an operation mode of the operational amplifier to a high speed mode, a middle speed mode or a low speed mode according to a setting value of the SPI control register 181.

Moreover, the individual amplifier AMP 1 can be configured an I/V amplifier, an inverting amplifier, a subtraction (differential) amplifier, a non-inverting amplifier and an addition amplifier by switching each switch and multiplexer.

Next, the SPI interface 180 which functions as a control circuit in the AFE unit 100 will be described in detail. The control circuit (e.g. SPI interface 180) according to the first embodiment receives a plurality of commands for specifying circuit forms and circuit configurations of analog functional circuits, and controls the switch circuit group based on the plurality of commands. Further, the SPI interface 180 controls the switch circuit group in an order different from the order of the received commands in response to reception of a command execution instruction defined as one of the plurality of commands. More specifically, the SPI interface 180 executes the received circuit change commands in an order corresponding to the order set in advance without executing the received circuit change commands in the reception order. The order in which the SPI interface 180 executes commands can be specified by, for example, a memory map of the SPI control register 181.

Figure 5:
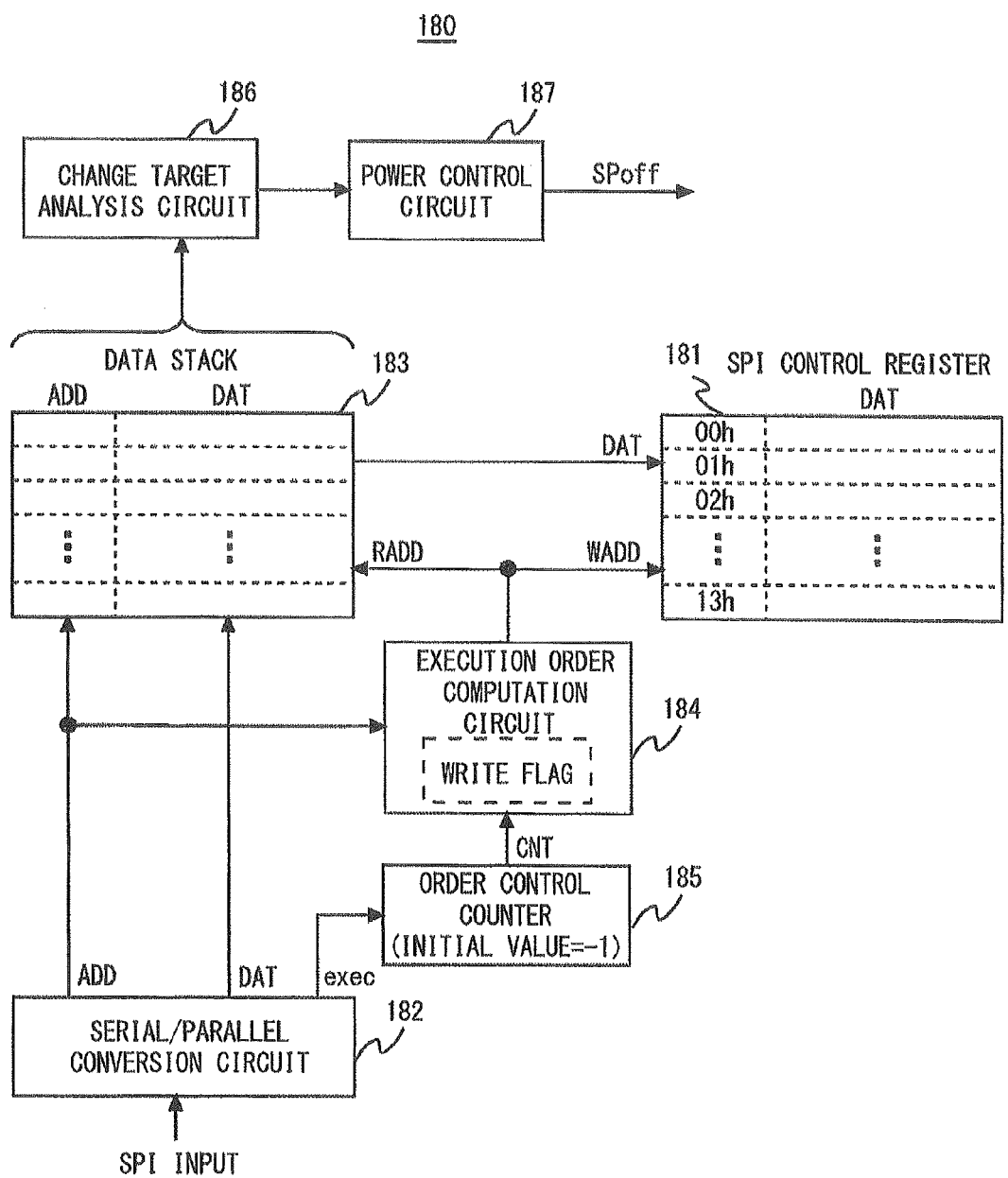
FIG. 5 is a block diagram of a SPI interface according to the first embodiment.

Next, FIG. 5 illustrates a detailed block diagram of the SPI interface 180. As illustrated in FIG. 5, the SPI interface 180 has a SPI control register 181, a serial/parallel conversion circuit 182, a data stack 183, an execution order computation circuit 184, an order control counter 185, a change target analysis circuit 186 and a power control circuit 187.

The SPI control register 181 has a plurality of registers whose address values are determined in advance. This register has data region DAT, and a value of a data portion of a circuit change command is stored therein. The registers of the SPI control register 181 are configured to values for controlling the respective switches in advance. Next, FIG. 6 illustrates a view for explaining a register map of the SPI control register 181.

As illustrated in FIG. 6, the SPI control register 181 stores 8 bit data per address. Further, which function is changed according to data is defined in each register. An example of a register controlled by each register is, for example, as follows.

A register of an address 00h is defined as a circuit form change register 1. Further, in the circuit form change register 1, values for specifying an opened/closed state of the switches 113a to 113c illustrated in FIG. 4 and three switches corresponding to the switches 113a to 113c which are switches provided to the individual amplifier AMP 2 in FIG. 3 are stored. Furthermore, a register of an address 03h is defined as an input/output setting register 1. In the input/output setting register 1, a value for specifying an input signal selected by, for example, the switches SW 10 and SW 11 illustrated in FIG. 4 is stored. Further, a register of an address 08h is defined as a DAC setting register 1. In the DAC setting register 1, values for specifying output values of the DAC 114 are stored. Further, a register of an address 0Ch is defined as an amplifier gain setting register 1. In the amplifier gain setting register 1, values for setting gains of the individual amplifier AMP 1 are stored.

Further, the serial/parallel conversion circuit 182 illustrated in FIG. 5 receives SPI input signals (signals including CS, SCLK and SDI), converts the input data SDI which is serial data into parallel data, and supplies the parallel data to the data stack 183. This input data SDI is a signal in which a mode specifying value, address data ADD for specifying registers of the SPI control register 181 and the data DAT are arrayed in series. The mode specifying value is a value indicating, for example, a read mode, a write mode or an execution mode.

Figure 7:
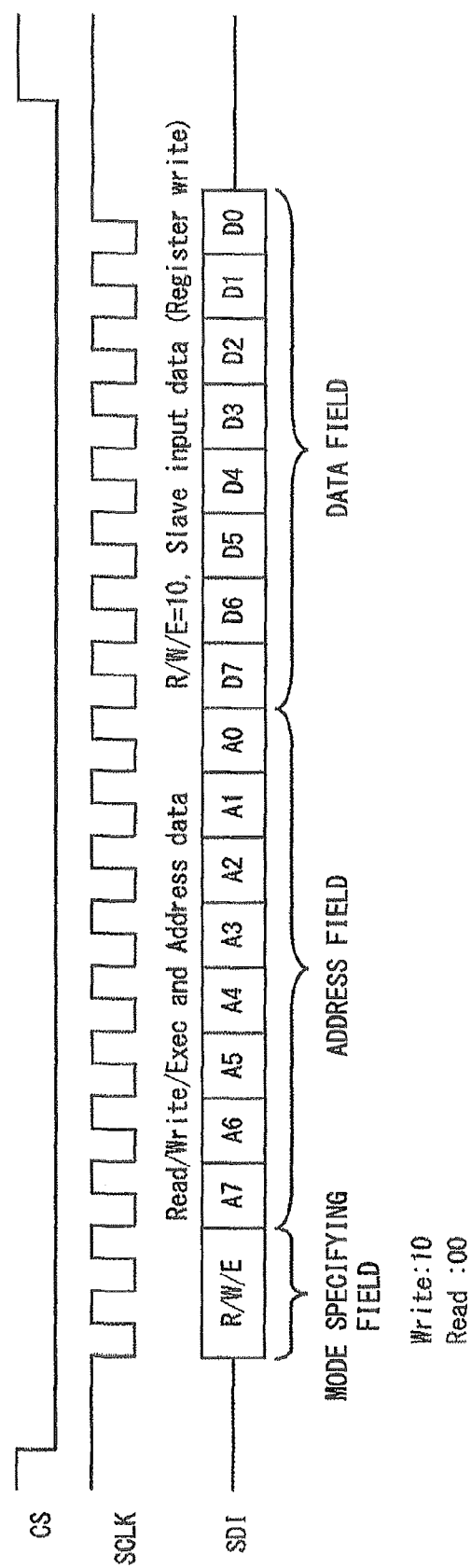
FIG. 7 is a timing chart in a case where circuit change commands used in the semiconductor device according to the first embodiment are transmitted.
Figure 8:
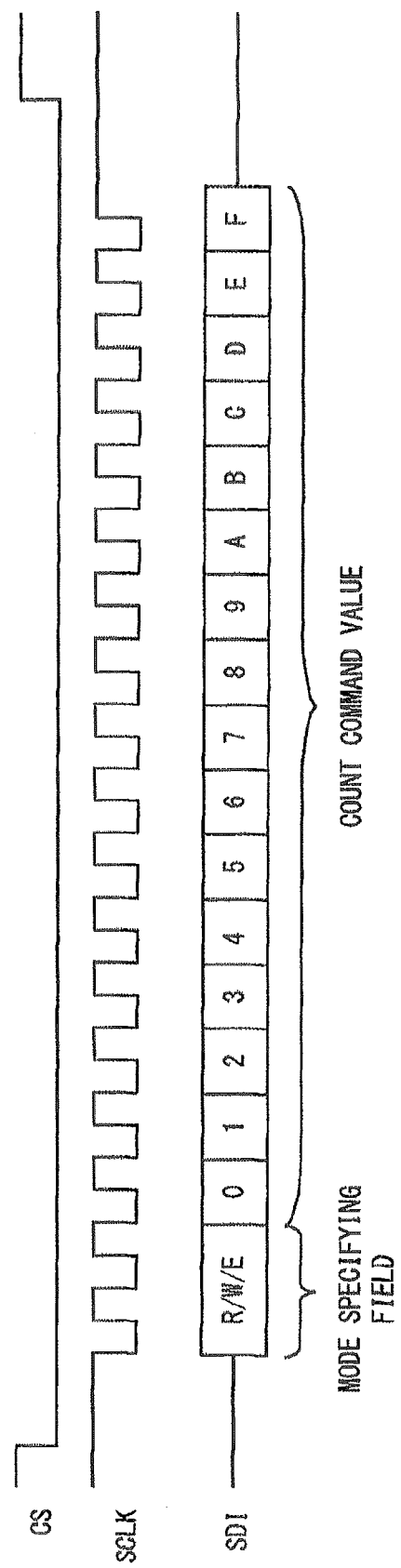
FIG. 8 is a timing chart in a case where a command execution instruction used in the semiconductor device according to the first embodiment is transmitted.

Hereinafter, a data format of a circuit change command used in the semiconductor device 1 according to the first embodiment will be described. FIGS. 7 and 8 illustrate timing charts in a case where commands are transmitted from the MCU unit 200 to the AFE unit 100. An example illustrated in FIG. 7 indicates a basic data format of a circuit change command, and an example illustrated in FIG. 8 indicates a data format of a command execution instruction defined as one of the circuit change commands.

As illustrated in FIG. 7, in the circuit change command, an address field and a data field are defined subsequent to a mode specifying field. The mode specifying field includes a 2 bit value, and the address field and the data field include 8 bit values. Further, the circuit change command specifies the read mode to the SPI interface 180 when a value of the mode specifying field is 00. In the case of the read mode, the SPI interface 180 outputs data stored in, for example, a circuit block which is not illustrated in FIG. 5 as the read data SDO (not illustrated in FIG. 7). Meanwhile, when a value of the mode specifying field is 10, the circuit change command specifies the write mode to the SPI interface 180. In the case of the write mode, the SPI interface 180 writes data to be supplied as a write data in the SPI control register 181.

As illustrated in FIG. 8, in the command execution instruction, count command values are defined at positions corresponding to the address field and the data field of the circuit change command illustrated in FIG. 7. These count command values are 16 bit values. The count command value specifies a maximum count value of the order control counter 185. It is possible to recognize that the circuit change command is a command execution instruction, based on the value of the mode specifying field being 11. The serial/parallel conversion circuit 182 commands the order control counter 185 to start counting when the value of the mode specifying field is 11.

Further, as illustrated in FIGS. 7 and 8, the semiconductor device 1 transmits a circuit change command in a period in which the chip select signal CS is at a low level. Furthermore, the semiconductor device 1 transmits the serial clock SCLK which includes a rising edge at a position corresponding to each bit of the circuit change command, together with the write data. The SPI interface 180 converts serial data into parallel data using the serial clock SCLK.

Further, the data stack 183 illustrated in FIG. 4 stores a plurality of commands transmitted from the MCU unit 200. The data stack 183 stores commands in the reception order. In this data stack 183, the address data ADD and the data DAT included in the commands are stored. The data DAT includes circuit form setting values for specifying circuit forms of a plurality of analog functional circuits, and circuit configuration setting values for specifying, for example, circuit characteristics of the analog functional circuits.

The execution order computation circuit 184 determines an execution order of a plurality of commands stored in the data stack 183. Further, the execution order computation circuit 184 transfers data from the data stack 183 to the SPI control register 181 in such a way that the commands are executed in a determined order. In this case, the execution order computation circuit 184 rearranges a command execution order according to a predetermined execution order irrespectively of the command execution order stored in the data stack 183. The execution order computation circuit 184 includes write flags used to determine the above execution order.

More specifically, in the present embodiment, addresses of the registers of the SPI control register 181 are defined in the command execution order. Hence, the execution order computation circuit 184 determines the execution order in such a way that the address values of the commands stored in the data stack 183 are in an ascending order. Further, the execution order computation circuit 184 reads the data DAT from the data stack 183 in a determined order, and transfers the data to the SPI control register 181.

Furthermore, the SPI control register 181 according to the first embodiment includes a register map in which addresses become larger in accordance with an order of the circuit form setting commands for specifying circuit forms, circuit configuration commands for specifying circuit configurations and power control commands for controlling power sources of a plurality of analog functional circuits. In, for example, the register map of the SPI control register 181 illustrated in FIG. 6, circuit form setting commands are defined in addresses 00h to 06h, circuit configuration commands are defined in addresses 07h to 10h and power control commands are defined in addresses 11h to 13h. The addresses of the commands and the register map of the SPI control register 181 are defined, so that the SPI interface 180 executes the commands in an order of circuit form setting commands for specifying circuit forms, circuit configuration setting commands for specifying circuit configurations and power control commands for controlling power sources of a plurality of analog functional circuits irrespectively of the reception order of the commands.

Hereinafter, a method of calculating a command execution order in the execution order computation circuit 184 will be described in more detail. FIG. 9 is a view for explaining processing in the execution order computation circuit 184 according to the first embodiment.

As illustrated in FIG. 9, the execution order computation circuit 184 according to the first embodiment places write flags corresponding to address values of stored commands in an enable state (e.g. 1) every time the command is stored in the data stack 183.

Further, the execution order computation circuit 184 calculates an integration value Sigma using the value of the write flag. This integration value Sigma is calculated according to Sigma [n]=Sigma [n]+Sigma [n−1] when a command number corresponding to a write flag F is n. In addition, the command corresponding to the address 00h has command number 0, and therefore an integration value is not calculated. Further, a command corresponding to the address 01h has command number 1, and therefore the integration value Sigma is calculated according to Sigma [1]=F [0]+F [1].

Furthermore, the execution order computation circuit 184 determines a control order value Order [n] based on an integration result of the above integration value Sigma and the write flags. In an example illustrated in FIG. 9, a command corresponding to the address 00h includes a write flag F [0]=1, and is calculated according to Order [0]=F [0]*F [0]=1. Further, a command corresponding to the address 01h has the write flag F [1]=1, and is calculated according to Order [0]=Sigma [1]*F [1]=2.

That is, the execution order computation circuit 184 includes write flags corresponding to address values of command which are likely to be written, and places write flags corresponding to the address values of a command stored in an enable state every time the command is written in the data stack 183. Further, the execution order computation circuit 184 integrates numbers of commands whose write flags are placed in the enable state, and integrates an integration value and values of the write flags to determine the control order value Order in such a way that address values of the commands stored in the data stack 183 are in an ascending order.

Furthermore, the order control counter 185 illustrated in FIG. 4 increases a count value CNT in response to reception of a command execution instruction in the serial/parallel conversion circuit 182. A command execution instruction includes a count command value and therefore the order control counter 185 counts the number of clocks of serial clock signals until the count value CNT reaches the count command value, and increases the count value. In addition, an initial value of the count value of the order control counter 185 is −1. Further, the order control counter 185 reverses the count value CNT to the initial value after the count value CNT reaches the count command value.

Furthermore, the execution order computation circuit 184 compares the count value CNT and the control order value Order outputted from the order control counter 185. The execution order computation circuit 184 outputs the address value including the control order value Order matching the count value CNT as a read address RADD to the data stack 183 and outputs the address value as a write address WADD. By this means, the command including the address values corresponding to the control order value Order matching the count value CNT is transferred from the data stack 183 to the SPI control register 181. That is, the SPI interface 180 stores commands temporarily stored in the data stack 183, in a plurality of registers (e.g. the SPI control register 181) in such a way that address values corresponding to write flags placed in the enable state are in an ascending order or descending order.

Further, the change target analysis circuit 186 illustrated in FIG. 4 monitors the commands stored in the data stack 183, and commands the power control circuit 187 to cut the power sources of the analog functional circuits when the stored commands are circuit form setting commands. The power control circuit 187 cuts the power sources of the analog functional circuits based on the commands from the change target analysis circuit 186. In addition, the power control circuit 187 cuts the power sources when the count value of the order control counter 185 is an initial value (e.g. −1).

That is, in the semiconductor device 1 according to the first embodiment, a plurality of commands for changing circuit forms and circuit configurations of analog functional circuits are each defined to include an address value for specifying an address of the register of the SPI control register 181. Further, in the SPI interface 180 which functions as a control circuit in the semiconductor device 1 according to the first embodiment, addresses of the registers of the SPI control register 181 are defined according to the command execution order. Furthermore, the SPI interface 180 temporarily stores the commands in the reception order, and stores data of the commands in the registers in an order (e.g. an ascending order) of address values included in the commands in response to reception of the command execution instruction. Still further, the SPI interface 180 employs the above configuration to execute the commands in the order of circuit form setting commands for specifying circuit forms, circuit configuration setting commands for specifying circuit configurations and power control commands for controlling power sources of a plurality of analog functional circuits irrespectively of the reception order of the commands.

Figure 10:
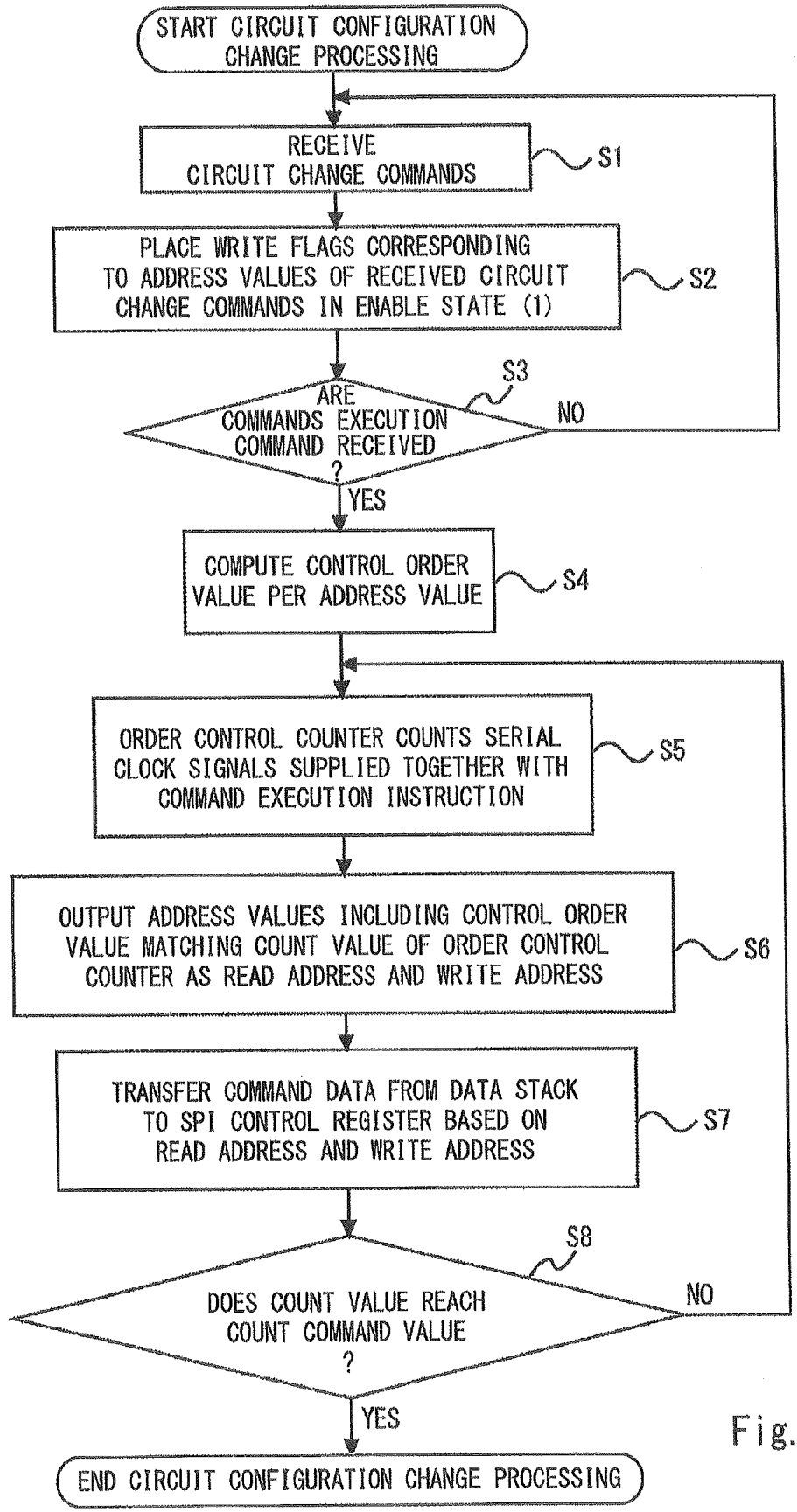
FIG. 10 is a flowchart of circuit change processing in the semiconductor device according to the first embodiment.

Next, an operation of the semiconductor device 1 according to the first embodiment will be described. Hereinafter, an operation related to the SPI interface 180 among the operations of the semiconductor device 1, i.e., circuit change processing will be described. FIG. 10 illustrates a flowchart of the circuit change processing in the semiconductor device 1 according to the first embodiment. In addition, FIG. 10 does not illustrate an operation of turning on and off power sources of the analog functional circuits when the circuits are changed in the AFE unit 100. However, the power sources of the analog functional circuits (the operational amplifier in particular) are preferably turned off when the circuits are changed. Further, the flowchart illustrated in FIG. 10 mainly indicates an operation of the SPI interface 180.

As illustrated in FIG. 10, when the circuit configuration change processing starts, the semiconductor device 1 according to the first embodiment first transmits circuit change commands from the MCU unit 200 to the AFE unit 100, and the SPI interface 180 receives the circuit change commands (step S1). Further, the SPI interface 180 places write flags corresponding to address values of circuit configuration commands received by the execution order computation circuit 184 from a disenable state (e.g. 0) in an enable state (e.g. 1) (step S2). The semiconductor device 1 repeatedly executes processing in the above steps S1 and S2 until the SPI interface 180 receives the command execution instruction (step S3).

Subsequently, when the SPI interface 180 receives the command execution instruction (a YES branch in step S3), the execution order computation circuit 184 of the SPI interface 180 computes a control order value per address value based on, for example, a table illustrated in FIG. 9 (step S4). In addition, when the execution order computation circuit 184 is configured as a combinational circuit, a control order value is calculated every time the circuit change command is received.

Subsequently, the SPI interface 180 causes the order control counter 185 to count the number of clocks of a serial clock signal inputted together with a command execution instruction, and count up the count value CNT (step S5). Further, the execution order computation circuit 184 outputs an address value including the control order value matching the count value CNT as the read address RADD and the write address WADD (step S6). Furthermore, the SPI interface 180 transfers data of the circuit change commands from the data stack 183 to the SPI control register 181 based on the read address RADD and the write address WADD outputted from the execution order computation circuit 184 (step S7). The SPI interface 180 repeats processing in step S5 to step S7 until the count value CNT of the order control counter 185 reaches the count command value indicated by the command execution instruction (step S8). Further, the SPI interface 180 finishes circuit configuration change processing at a point of time when the count value CNT reaches a maximum value (e.g. count command value) (a YES branch in step S8).

As described above, the semiconductor device 1 according to the first embodiment transmits the circuit change commands from the MCU unit 200 to the AFE unit 100, and executes the circuit change commands after an execution order of the received circuit change command is rearranged in the AFE unit 100. For example, by setting the addresses of the registers of the SPI control register 181 according to a changed order which is checked in advance so that a problem will not be caused, and rearranging the circuit change commands in the order of the addresses of the registers, the circuit change commands can be executed. Consequently, the user can avoid a problem such as occurrence of an inrush current due to, for example, a direct current path while performing programming in which only a configuration after the circuit change is considered.

Further, circuit change commands are executed in a certain order irrespectively of an input order of the circuit change commands. Consequently, it is possible to avoid a situation where a circuit configuration which damages the semiconductor device 1 is formed and, consequently, the semiconductor device 1 according to the first embodiment 1 can secure high reliability.

Second Embodiment

A semiconductor device 1 according to the first embodiment controls an AFE unit 100 according to a control program stored in a memory of the AFE unit 100. However, a method of optimizing an execution order of circuit change commands at a stage of generation of the program will be described in the second embodiment. In addition, the control program stored in a MCU unit 200 is compiled into a machine language to enable high speed processing in the MCU unit 200. Hence, in the following description, a program compiled into the machine language is referred to as an object file, and is distinguished from, for example, a program described by an advanced language such as the C language. Further, the program described by the advanced language such as the C language is referred to as a code file below.

Figure 11:
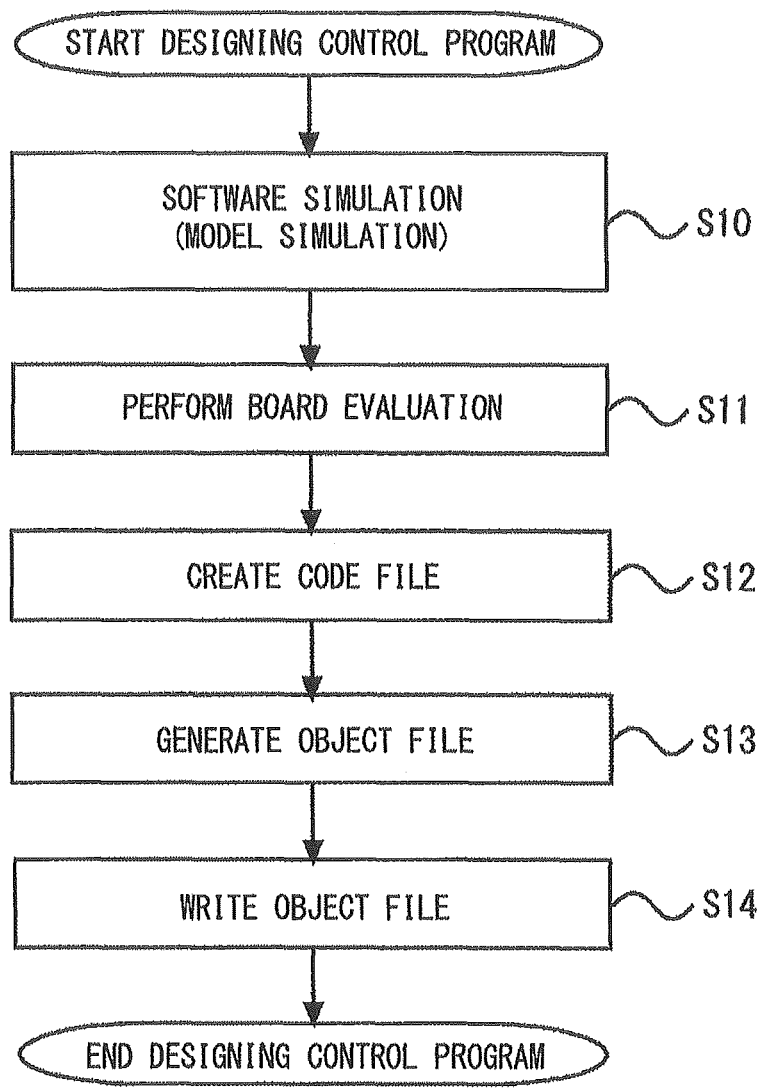
FIG. 11 is a flowchart illustrating a process of generating an object file for controlling the semiconductor device according to the first embodiment.

First, a process of generating control programs stored in the semiconductor device 1 will be described. FIG. 11 is a flowchart illustrating the process of generating the control programs for controlling the semiconductor device 1 according to the first embodiment. As illustrated in FIG. 11, an object file for controlling the semiconductor device 1 according to the first embodiment is generated by compiling a code file created after an operation of the semiconductor device 1 is verified.

More specifically, first, the operation of the semiconductor device 1 is verified by software simulation (step S10). According to this software simulation, for example, model simulation of modeling analog functional circuits of the AFE unit 100 and simulating parameters for setting circuit forms and characteristics are performed.

Subsequently, board evaluation of actually controlling the semiconductor device 1 according to the circuit form and the circuit configuration verified by the model simulation is performed (step S11). According to this board evaluation, hardware is actually operated to verify whether or not the semiconductor device 1 operates with the intended characteristics.

Subsequently, a code file obtained by reflecting parameters which are determined so as not to cause a problem upon the board evaluation being performed, in a program is created (step S12). In this code file, circuit change commands are described according to a predetermined format. Further, the code file is described by an advanced language.

Subsequently, the code file created in step S12 is compiled to generate an object file (step S13). Further, the object file generated in step S13 is written in the semiconductor device 1 (step S14). By this means, the semiconductor device 1 is placed in a state where the semiconductor device 1 can be controlled by the verified program.

Figure 12:
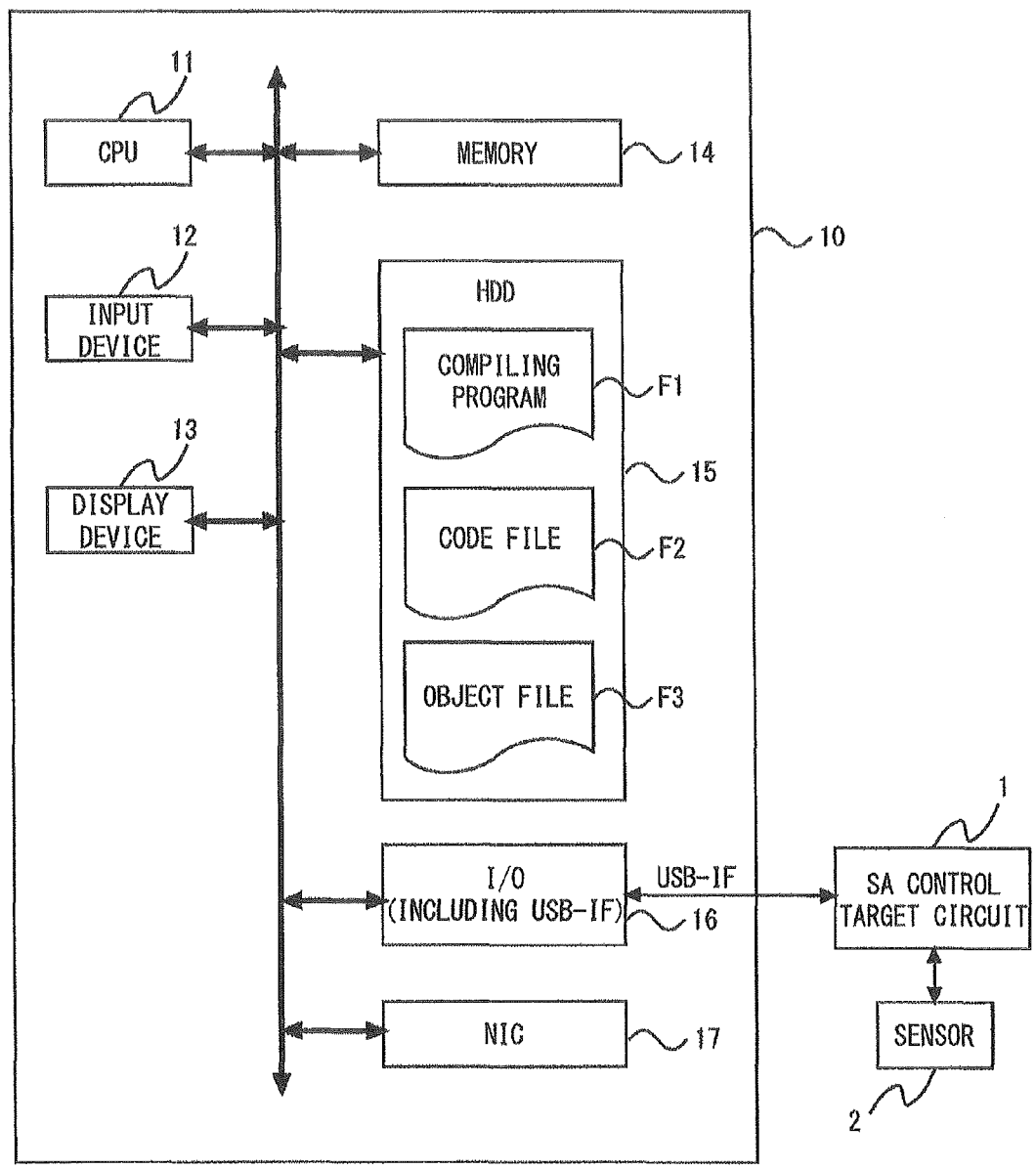
FIG. 12 is a block diagram of a compiling device according to a second embodiment.

In the second embodiment, a command execution order is optimized in the compile processing performed in above step S13. FIG. 12 illustrates a block diagram of a compiling device 10 according to the second embodiment. As illustrated in FIG. 12, the compiling device 10 according to the second embodiment is a computing device such as a personal computer. The compiling device 10 has a computing unit (e.g. a CPU 11), an input device 12, a display device 13, a memory 14, a storage device 15, an I/O interface 16 and a network interface 17. Further, the semiconductor device 1 is connected with the compiling device 10 through the I/O interface 16 of the compiling device 10. Furthermore, the semiconductor device 1 is connected with a sensor 2.

In the storage device 15 of the compiling device 10, a compiling program F1, a code file F2 and an object file F3 are stored. The code file F2 may be created by a user on the compiling device 10 or may be created by another device.

The CPU 11 generates the object file F3 from the code file F2 by executing the compiling program F1. The CPU 11 uses the memory 14 as a place for storing an intermediate file generated during execution of the program. Further, the input device 12 and the display device 13 are user interfaces which function when the user uses the compiling device 10. Furthermore, the I/O interface 16 of the compiling device 10 is, for example, an interface which connects external equipment such as a USB (Universal Serial Bus) and the compiling device 10. The network interface 17 is an interface which connects the compiling device 10 to a public network and a local area network (LAN).

Figure 13:
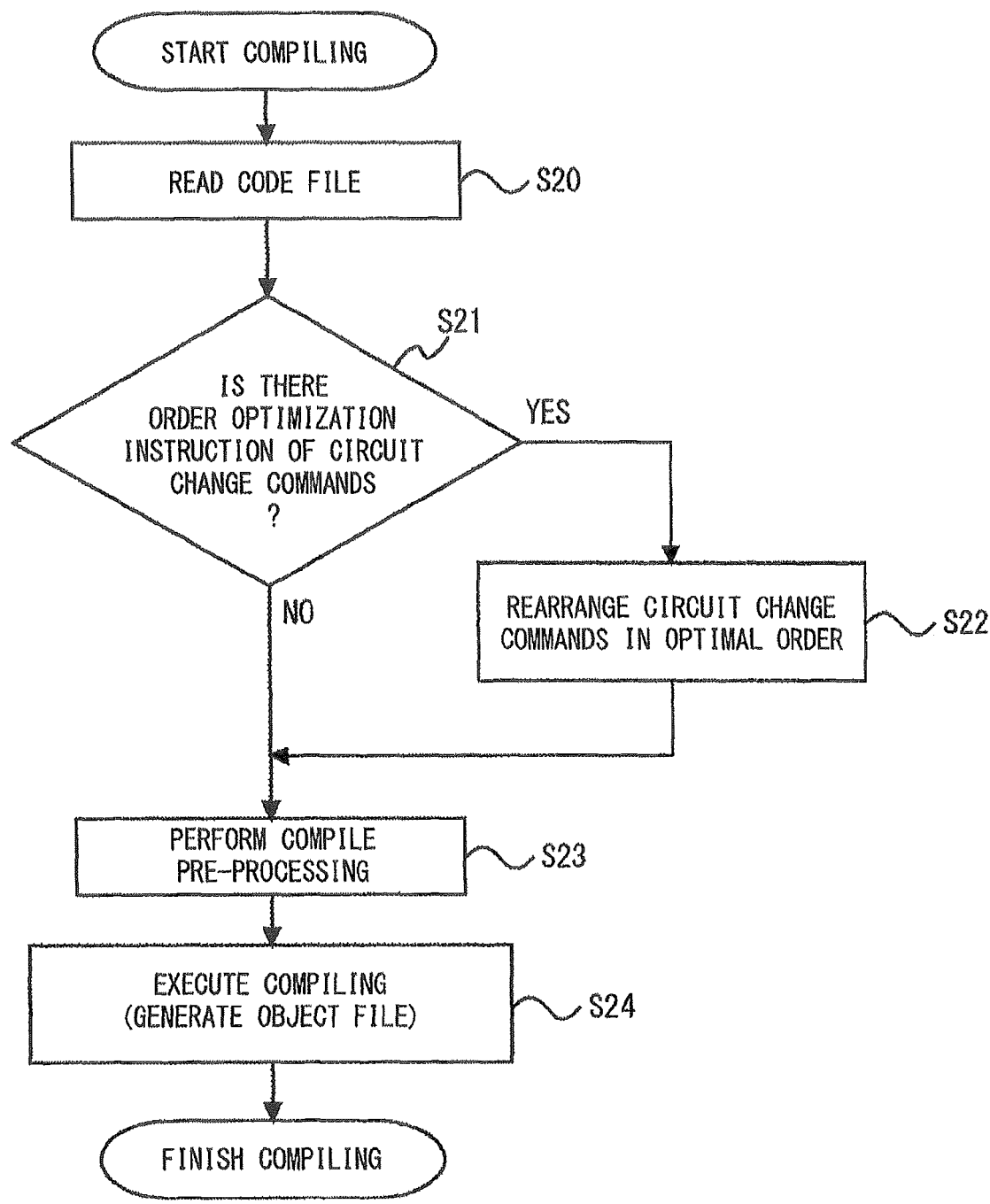
FIG. 13 is a flowchart illustrating compile processing according to the second embodiment.

Subsequently, processing in the compiling device 10 according to the second embodiment will be described in detail. FIG. 13 illustrates a flowchart of the compile processing of the compiling device 10 according to the second embodiment.

As illustrated in FIG. 13, the compiling device 10 first reads the code file F2 from the storage device 15 upon start of compiling (step S20). Further, the compiling device 10 determines whether or not there is an order optimization instruction of circuit change commands in the read code file (step S21). Furthermore, when it is determined in step S21 that there is an optimization instruction of the circuit change commands (a YES branch in step S21), the compiling device 10 performs optimization processing for rearranging the circuit change commands in an optimal order (step S21). Meanwhile, when it is determined in step S21 that there is no optimization instruction of circuit change commands (a NO branch in step S21), the compiling device 10 performs compile pre-processing and generates an intermediate file (step S23). In the compile pre-processing, macro substitution processing, conditional compile processing and the like are performed. Subsequently, the compiling device 10 generates the object file F3 by performing the compile processing on the intermediate file (step S24). The compiling device 10 writes this object file F3 in the semiconductor device 1 through the I/O interface 16.

Figure 14:
FIG. 14 is a view for explaining optimization processing in step S22 illustrated in FIG. 13.

Hereinafter, the order optimization processing will be described in more detail. FIG. 14 illustrates a view for explaining the optimization processing in step S22 illustrated in FIG. 13. FIG. 14 is a view for comparing a code file before and after the order optimization processing. In an example illustrated in FIG. 14, only a portion of the code file in which circuit change commands are described is illustrated.

As illustrated in FIG. 14, in the code file, #SACOM_ST and #SACOM_EN are order optimization instructions. Further, optimization target circuit change commands are described at a portion sandwiched by #SACOM_ST and #SACOM_EN. The circuit change commands are described at a portion sandwiched by { } in an order of register addresses and values of commands. The values of the commands change depending on what state is specified as an opened/closed state of a switch circuit and an operation mode of a circuit.

Further, by executing the order optimization processing of the compiling device 10, the original code file on the left side in FIG. 14 is changed to the optimized code file on the right side in FIG. 14. In the original code file which is not optimized, the address values of the commands described at an upper portion of the original code file are not in an ascending order. Meanwhile, in the code file in which the order is optimized, the address values of the commands are changed to the ascending order. Further, by performing the order optimization processing, a power control command for controlling on and off of power sources is substituted for an order optimization instruction prior to and subsequent to the commands.

In addition, the order of the circuit change commands optimized by the compiling device 10 according to the second embodiment, for example, corresponds to the order of register addresses of the SPI control register 181. That is, the compiling device 10 arranges the circuit change commands in an order of circuit form setting commands, circuit configuration setting commands and power control commands.

As described above, the compiling device 10 according to the second embodiment rearranges circuit change commands in a code file in an order set in advance and then generates an object file. Consequently, the semiconductor device 1 which executes as a control program the object file generated by the compiling device 10 does not operate in an unintended operation state. That is, the compiling device 10 generates an object file and, consequently, it is possible to improve the reliability of the semiconductor device 1.

Further, the semiconductor device 1 is operated by the object file generated by the compiling device 10. Consequently, even when, for example, an execution order computation circuit 184, an order control counter 185 and the like are not provided in an SPI interface 180, it is possible to avoid the semiconductor device 1 operating in an unintended operation state. That is, the compiling device 10 uses the object file and, consequently, it is possible to reduce a circuit scale of the semiconductor device 1 (the AFE unit 100 in particular).

Third Embodiment

Execution order optimization processing of circuit change commands in a design support device used for the board evaluation in FIG. 11 in the flowchart illustrated in FIG. 11 will be described in the third embodiment. The design support device according to the third embodiment can be realized by operating a design support program using, for example, a personal computer and the like. That is, the design support device according to the third embodiment is substantially the same as the compiling device 10 illustrated in FIG. 12 from the viewpoint of hardware, and therefore will not be described below.

The design support device according to the third embodiment is realized by the design support program. However, the design support program includes presenting circuit forms and changeable circuit parameters to a user using GUIs (Graphical User Interface) on a display device, and transmitting the circuit parameter specified on the GUI to a semiconductor device 1 according to a user's operation. Consequently, the user can verify the operation of the semiconductor device 1 based on the circuit parameters set on the GUIs. Further, the design support device according to the third embodiment generates a code file including circuit change commands based on the circuit parameters set on the GUI screen.

The design support device according to the third embodiment executes processing of optimizing a command execution order in two processing performed to transmit circuit change commands to the semiconductor device 1 and to generate a code file based on circuit parameters set on the GUI screen.

Figure 15:
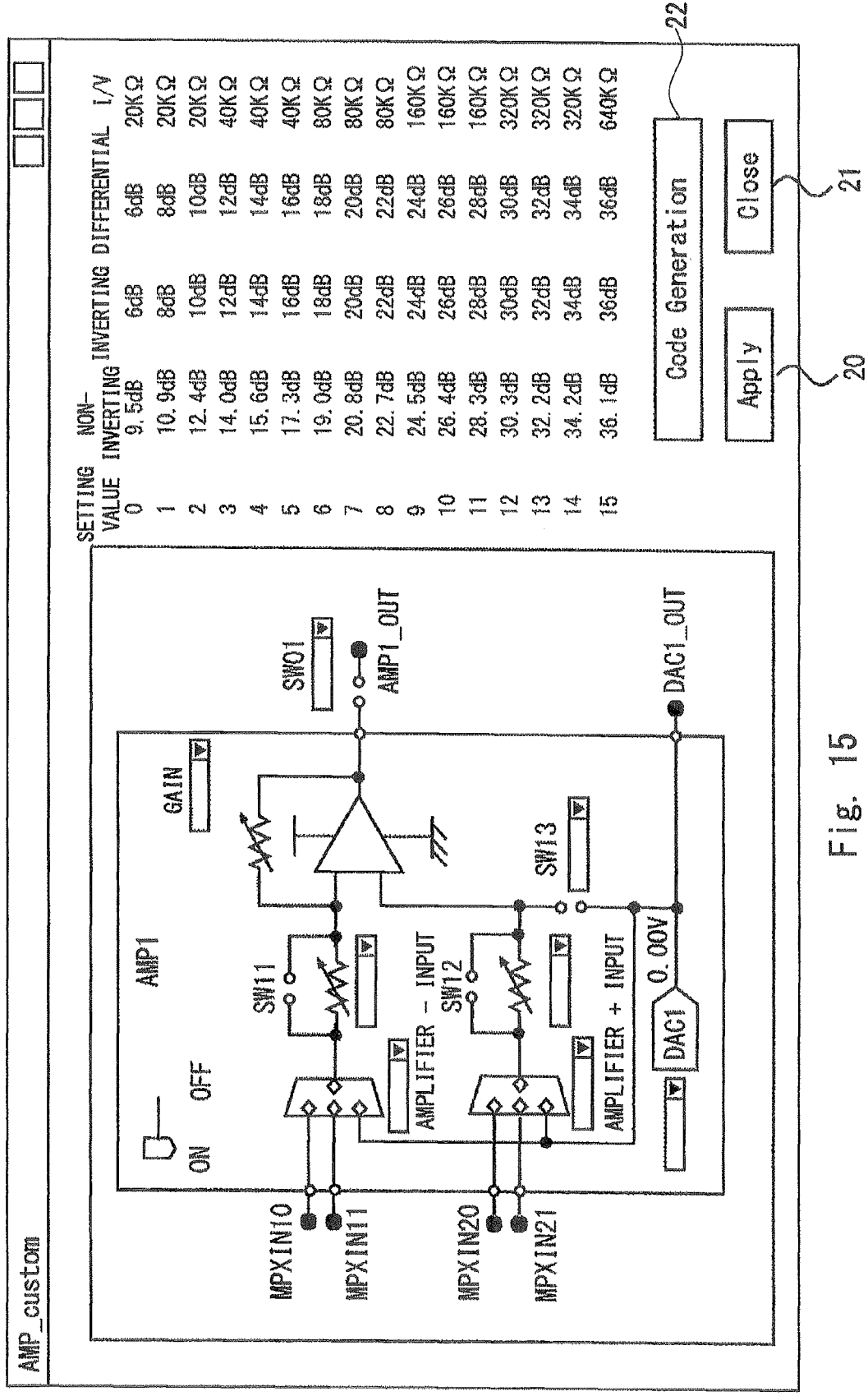
FIG. 15 is a view for explaining a circuit custom window used in a design support device according to a third embodiment.

Next, the GUI screen displayed on the display device in the design support device according to the third embodiment will be described. FIG. 15 illustrates a view for explaining a circuit custom window used in the design support device according to the third embodiment. FIG. 16 illustrates a view for explaining a register setting value check screen for checking setting states of circuit parameters used in the design support device according to the third embodiment.

An AMP 1 is used as an individual amplifier in the circuit custom window illustrated in FIG. 15. As illustrated in FIG. 15, the circuit custom window displayed by the design support device according to the third embodiment includes a circuit display portion which indicates a connection relationship of circuits. Further, in the circuit display portion, the changeable circuit parameters can be selected from a pull-down menu. The user can select a gain, an input and a circuit form of a circuit by operating the pull-down menu. Further, relationships between setting values and characteristics such as a gain when a circuit is used as a non-inverting amplifier, an inverting amplifier, a differential amplifier and an I/V amplifier are displayed next to the circuit display portion.

Furthermore, in the circuit custom window, an apply button 20, an end button 21 and a code generation button 22 are provided. When the apply button 20 is pushed, the design support device transmits circuit change commands for reflecting in an AFE unit 100 a circuit setting displayed on the GUI screen, to the connected semiconductor device 1. When the end button 21 is pushed, the design support device closes the GUI screen and ends the design support program. When the code generation button 22 is pushed, the design support device outputs a code file including circuit change commands for reflecting in the AFE unit 100 the circuit setting displayed on the GUI screen.

Further, a register list window illustrated in FIG. 16 is a screen displayed together with the circuit custom window in FIG. 15. The register list window includes in an upper stage portion a register check window 23 which displays a list of registers indicating current states of circuits in the AFE unit 100 and in a lower stage portion a change/reservation window 24 which displays changed values of the registers of the AFE unit 100. The design support device according to the third embodiment changes and reserves changed circuit parameters, and outputs circuit change commands in an optimal order in response to pushing of the apply button 20 of the circuit custom window.

Figure 17:
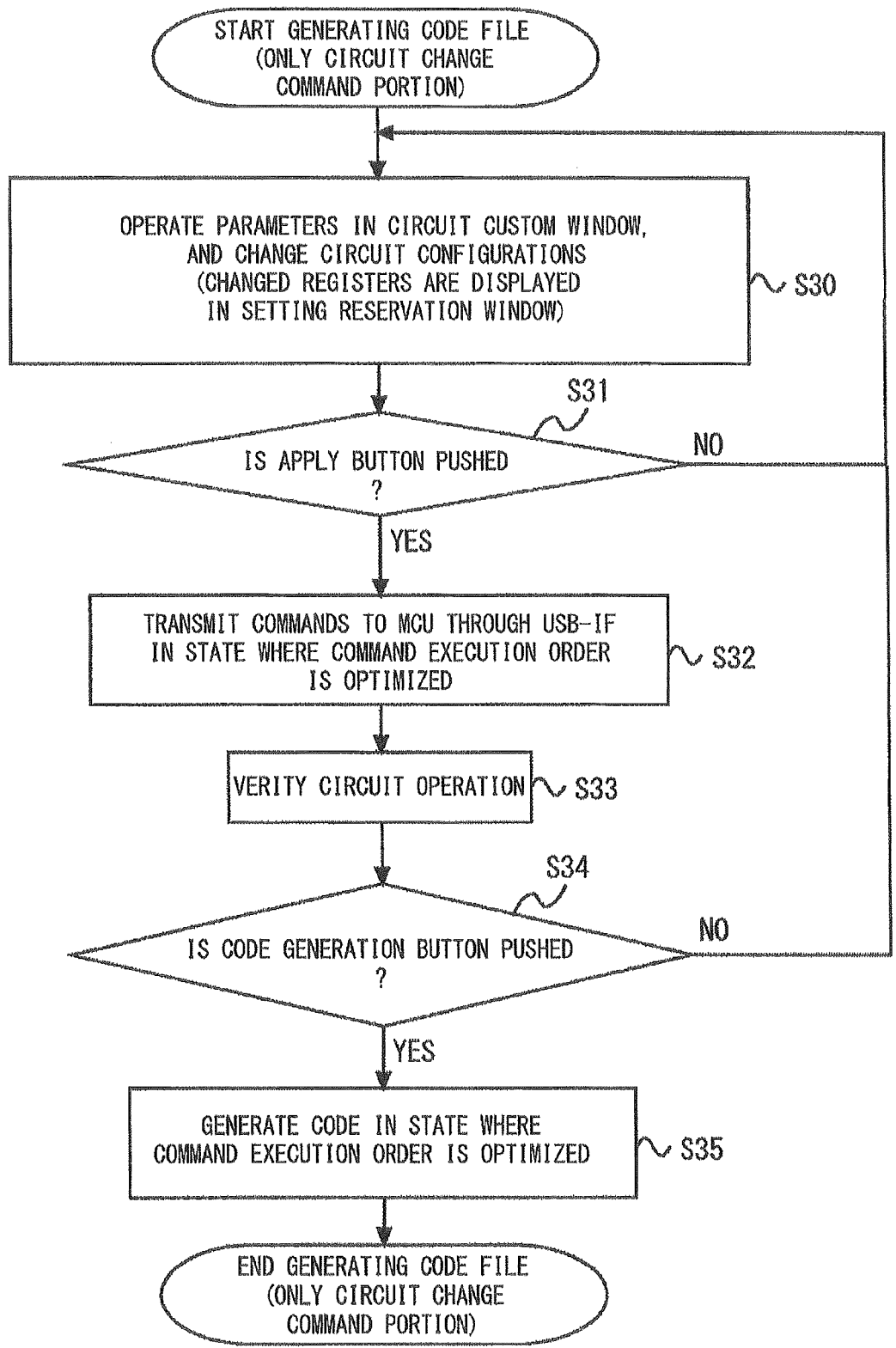
FIG. 17 is a flowchart of code file generation processing in the design support device according to the third embodiment.

Next, an operation of the design support device according to the third embodiment will be described. FIG. 17 is a flowchart illustrating the operation of the design support device according to the third embodiment. In addition, the flow shown in the flowchart illustrated in FIG. 17 is a flow for generating only a code file portion related to circuit change commands for specifying circuit forms in the AFE unit 100 among the operations of the design support device.

As illustrated in FIG. 17, when the user operates parameters in the circuit custom window, the design support device according to the third embodiment receives changes in circuit forms and circuit configurations (step S30). Then the design support device according to the third embodiment displays changed registers on the change/reservation window 24.

Next, the design support device according to the third embodiment transmits commands to the semiconductor device 1 in a state where an execution order of the circuit change commands is optimized (step S32) in response to pushing of the apply button 20 (a YES branch in step S31). Further, the user verifies a circuit operation of the circuit set on the GUI of the design support device (step S33). Furthermore, in response to the user's pushing of the code generation button 22 (a YES branch in step S34), the design support device according to the third embodiment generates the code file in a state where the execution order of the circuit change commands is optimized (step S35).

In this regard, the design support device according to the third embodiment performs processing of optimizing the execution order of the commands in the command transmission processing in step S32 and the code file generation processing in step S35. This optimization processing is substantially the same as that in step S22 in the compiling device 10 according to the second embodiment.

Figure 18:
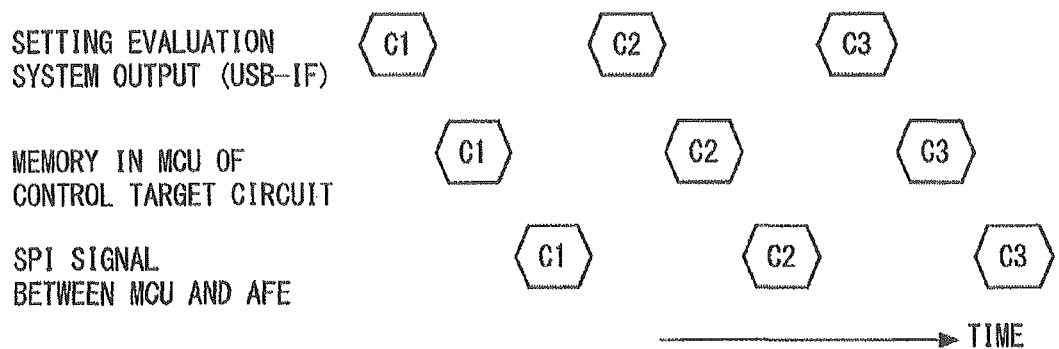
FIG. 18 is a timing chart for explaining a first example of transmission timings of commands transmitted from the design support device according to the third embodiment to a semiconductor device.
Figure 19:
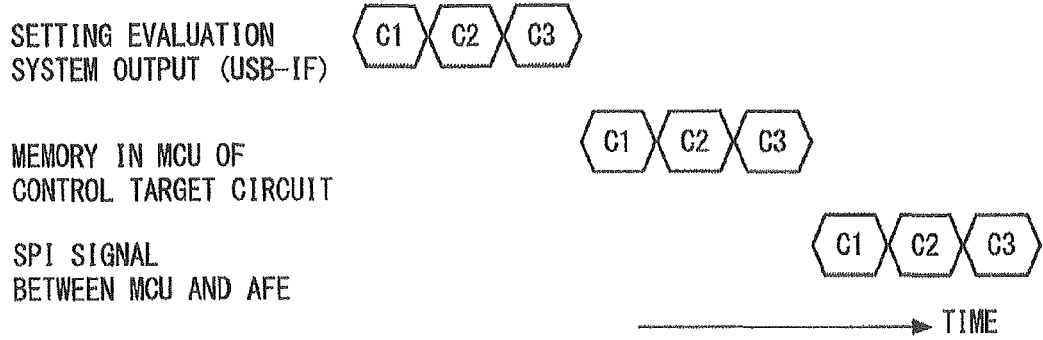
FIG. 19 is a timing chart for explaining a second example of transmission timings of commands transmitted from the design support device according to the third embodiment to the semiconductor device.

That is, the design support device according to the third embodiment displays GUIs which display changeable circuit parameters in a plurality of analog functional circuits, reserves circuit change commands corresponding to changed circuit parameters as correction target command codes, rearranges the reserved correction target command codes in a certain order according to a user's command, and outputs the correction target command codes in the rearranged order to the semiconductor device 1. FIGS. 18 and 19 illustrate timing charts of transmitting command codes from the design support device according to the third embodiment to the semiconductor device 1.

In an example illustrated in FIG. 18, circuit change commands are reserved in an order of C1, C3 and C2 on the change/reservation window 24. Further, in the example illustrated in FIG. 18, the commands are transmitted to the AFE unit 100 of the semiconductor device 1 one by one. The design support device outputs the circuit change commands in an order of, for example, addresses of registers in which the commands are stored instead of in a reservation order.

In an example illustrated in FIG. 19, the circuit change commands are reserved in an order of C1, C3 and C2 on the change/reservation window 24, which order is similar to that in the example illustrated in FIG. 18. Further, in the example illustrated in FIG. 19, the commands are collectively outputted to the semiconductor device 1. In this case, the design support device outputs the circuit change commands in an order of, for example, addresses of registers in which the commands are stored instead of in a reservation order.

Further, the design support device according to the third embodiment displays GUIs which display changeable circuit parameters in a plurality of analog functional circuits, reserves circuit change commands corresponding to changed circuit parameters as correction target command codes, and generates a code file in which command codes including the correction target command codes arranged in a certain order are described irrespectively of the reservation order of the correction target command codes according to a code file generation command. The code file generated by the design support device according to the third embodiment is a code file illustrated on the right side in FIG. 14B immediately after the generation of the code file.

In addition, the design support device according to the third embodiment rearranges circuit change commands in an order of circuit form setting commands for specifying circuit forms, circuit configuration setting commands for specifying circuit configurations and power control commands for controlling power sources of a plurality of analog functional circuits. Further, a command code of the power control commands for controlling the power sources of the analog functional circuits is inserted prior to and subsequent to command codes corresponding to circuit parameters in the commands and the code file outputted from the design support device according to the third embodiment.

As described above, the design support device according to the third embodiment provides a design environment which allows the user to easily set circuit parameters. In this case, the design support device according to the third embodiment rearranges circuit change commands corresponding to circuit parameters changed by the user, in an order which is verified in advance so that a failure will not be caused similar to the first and second embodiments, and outputs the circuit change commands. Consequently, the user can verify circuits and create code files without taking into account a failure of the semiconductor device 1 due to changes in circuits.

Further, by using the design support device according to the third embodiment, it is possible to generate a code file which can prevent the semiconductor device 1 from being damaged due to an unintended circuit operation and verify the operation even in a state where circuits such as an execution order computation circuit 184 and an order control counter 185 are not provided in a SPI interface 180 of the semiconductor device 1.

Fourth Embodiment

Figure 20:
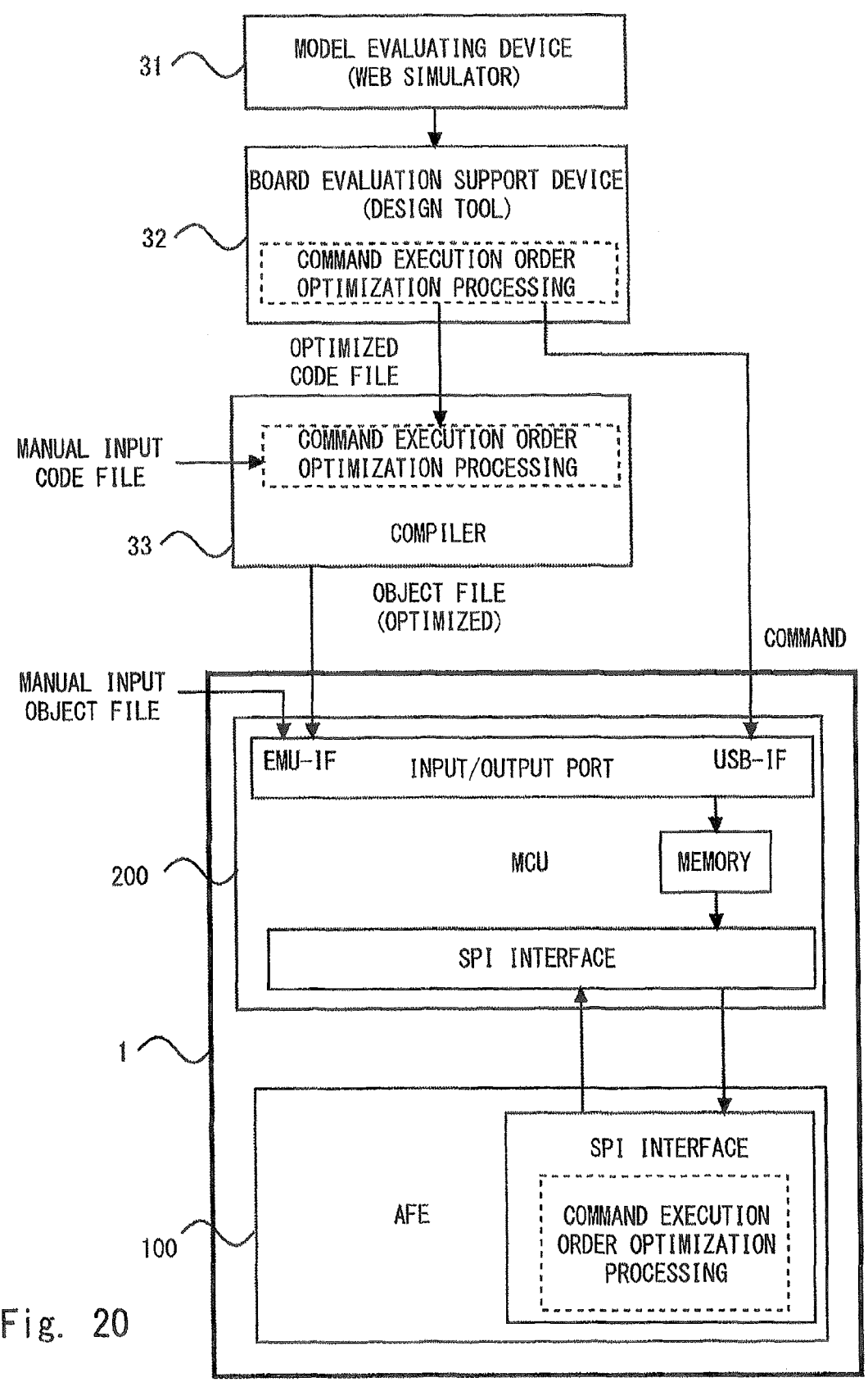
FIG. 20 is a block diagram of a design support device according to a fourth embodiment.

A design support system obtained by combining the devices described in the first to third embodiments will be described in the fourth embodiment. FIG. 20 illustrates a block diagram of the design support system according to the fourth embodiment.

As illustrated in FIG. 20, the design support system according to the fourth embodiment has a model evaluating device 31, a board evaluation support device 32 and a compiling device 33. Further, the design support system according to the fourth embodiment generates an object file which operates the semiconductor device 1 using the model evaluating device 31, the board evaluation support device 32 and the compiling device 33.

The model evaluating device 31 is a device which performs software simulation in step S10 in FIG. 11. The board evaluation support device 32 is, for example, a general computing device such as a personal computer, and executes a model simulation program on the computing device.

The board evaluation support device 32 is device which performs a board evaluation in step S11 in FIG. 11, and is the design support device according to the third embodiment. As described in the third embodiment, the board evaluation support device 32 outputs circuit change commands for reflecting circuit parameters specified by a user on a GUI screen, in a MCU unit 200. In this case, the board evaluation support device 32 performs command execution order optimization processing of rearranging circuit change commands in an execution order which is checked upon a verification being performed in advance so that a problem will not be caused. That is, an order of both circuit change commands outputted from the board evaluation support device 32 and supplied to the semiconductor device 1 through a USB interface and circuit change commands included in a code file to be generated is optimized irrespectively of a circuit change command from a user.

The compiling device 33 is a device which performs compile processing in step S13 in FIG. 11, and is the compiling device according to the second embodiment. The compiling device 33 individually compiles or combines and compiles code files outputted from the board evaluation support device 32 and manual input code files created by the user. As described in the second embodiment, this compiling device 33 performs command execution order optimization processing of rearranging an order of circuit change commands included in a code file according to an execution order which is checked upon a verification being performed in advance so that a problem will not be caused. Hence, the circuit change commands included in the object file outputted from the compiling device 33 are already optimized.

The semiconductor device 1 receives an input of the object file outputted from the compiling device 33 and an arbitrary object file created by the user. Further, the semiconductor device 1 stores the inputted object file in the memory, and performs an operation based on the stored object file.

Furthermore, the SPI interface of the semiconductor device 1 has an execution order computation circuit 184 and an order control counter 185 as described in the first embodiment. Consequently, even when an order of circuit change commands transmitted from the AFE unit 100 is not optimized, the semiconductor device 1 can optimize an execution order of the circuit change commands in the SPI interface, and then execute the circuit change commands.

As described above, the design support system according to the fourth embodiment executes processing of optimizing a command execution order at each stage at which circuit change commands are generated or executed. Consequently, the design support system according to the fourth embodiment can prevent a circuit state of the AFE unit 100 from being placed in an unintended state with high accuracy, and improve reliability of the semiconductor device 1.

Fifth Embodiment

Figure 21:
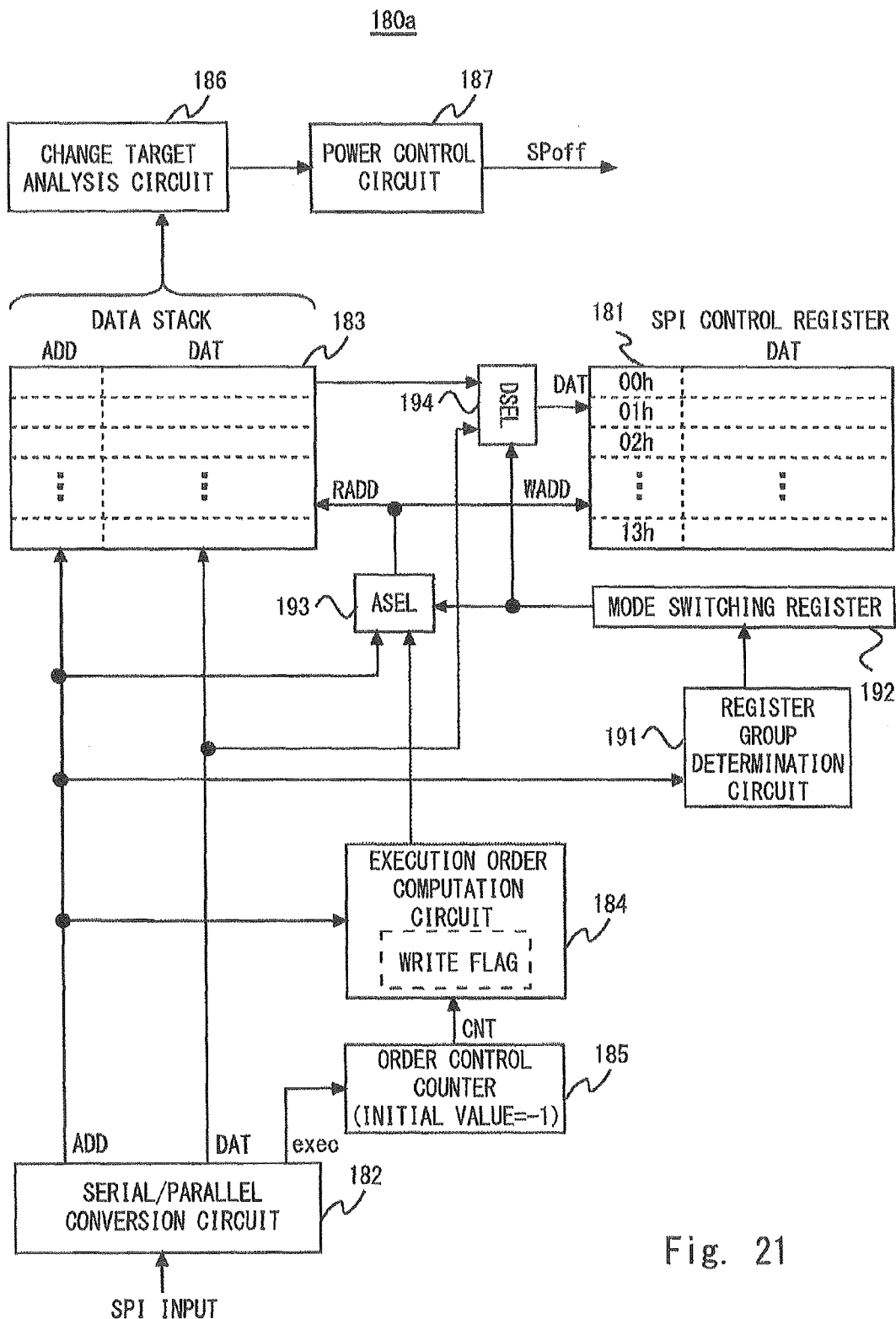
FIG. 21 is a block diagram of a SPI interface according to a fifth embodiment.

Another mode of a SPI interface 180 of a semiconductor device 1 according to the first embodiment will be described in the fifth embodiment. FIG. 21 illustrates a block diagram of a SPI interface 180a according to the fifth embodiment. In the description of the fifth embodiment, the same components as the components described in the first embodiment will be assigned the same reference numerals as those in the first embodiment and will not be described.

As illustrated in FIG. 21, the SPI interface 180a is formed by adding a register group determination circuit 191, a mode switching register 192 and selectors 193 and 194 to the SPI interface 180 according to the first embodiment.

The register group determination circuit 191 determines a command which is immediately executed without processing of optimizing an execution order after commands are received. The register group determination circuit 191 refers to address values of the received circuit change commands, and places values of the mode switching register 192 in an enable state (e.g. 1) when the circuit change commands belong to an immediate change group set in advance. Meanwhile, the register group determination circuit 191 places the value of the mode switching register 192 in a disenable state (e.g. 0) when the address values of the received circuit change commands do not belong to the immediate change group set in advance.

The selector 193 selects one of address values outputted from the execution order computation circuit 184 and address values of the received circuit change commands according to the value of the mode switching register 192, and outputs the selected address value as a read address RADD and a write address WARD. More specifically, the selector 193 selects the address values outputted from the execution order computation circuit 184 when the value of the mode switching register 192 is in the disenable state, and selects the address values of the received circuit change commands when the value of the mode switching register 192 is in the enable state.

The selector 194 selects one of data outputted from a data stack 183 and data of the received circuit change commands according to the value of the mode switching register 192, and writes the selected data in a SPI control register 181. More specifically, the selector 194 selects the data outputted from a serial/parallel conversion circuit 182 when the value of the mode switching register 192 is in a disenable state, and selects the data of the received circuit change commands when the value of the mode switching register 192 is in the enable state.

As described above, when it receives an input of circuit change commands belonging to an immediate change group, the SPI interface 180a according to the fifth embodiment immediately reflects data of the circuit change commands in the SPI control register 181 without temporarily holding the circuit change commands in the data stack 183. That is, when it receives an input of the circuit change command belonging to the immediate change group, the SPI interface 180a according to the fifth embodiment immediately executes the circuit change commands.

Next, FIG. 22 illustrates a view for explaining circuit change commands belonging to an immediate change group in the SPI interface 180a according to the fifth embodiment. FIG. 22 illustrates a register map of the SPI control register 181. As illustrated in FIG. 22, in the fifth embodiment, commands of addresses 07h to 0Eh used as circuit configuration setting commands among circuit change commands are classified into an immediate change group. When circuit configurations are changed according to the circuit configuration setting commands, for example, current paths of the circuits provided in an AFE unit 100 are not basically changed, and only resistance values and the like are switched. Therefore, even when values of the circuit configuration setting commands are changed, a problem that an unintended current flows in the semiconductor device 1 does not occur.

Figure 23:
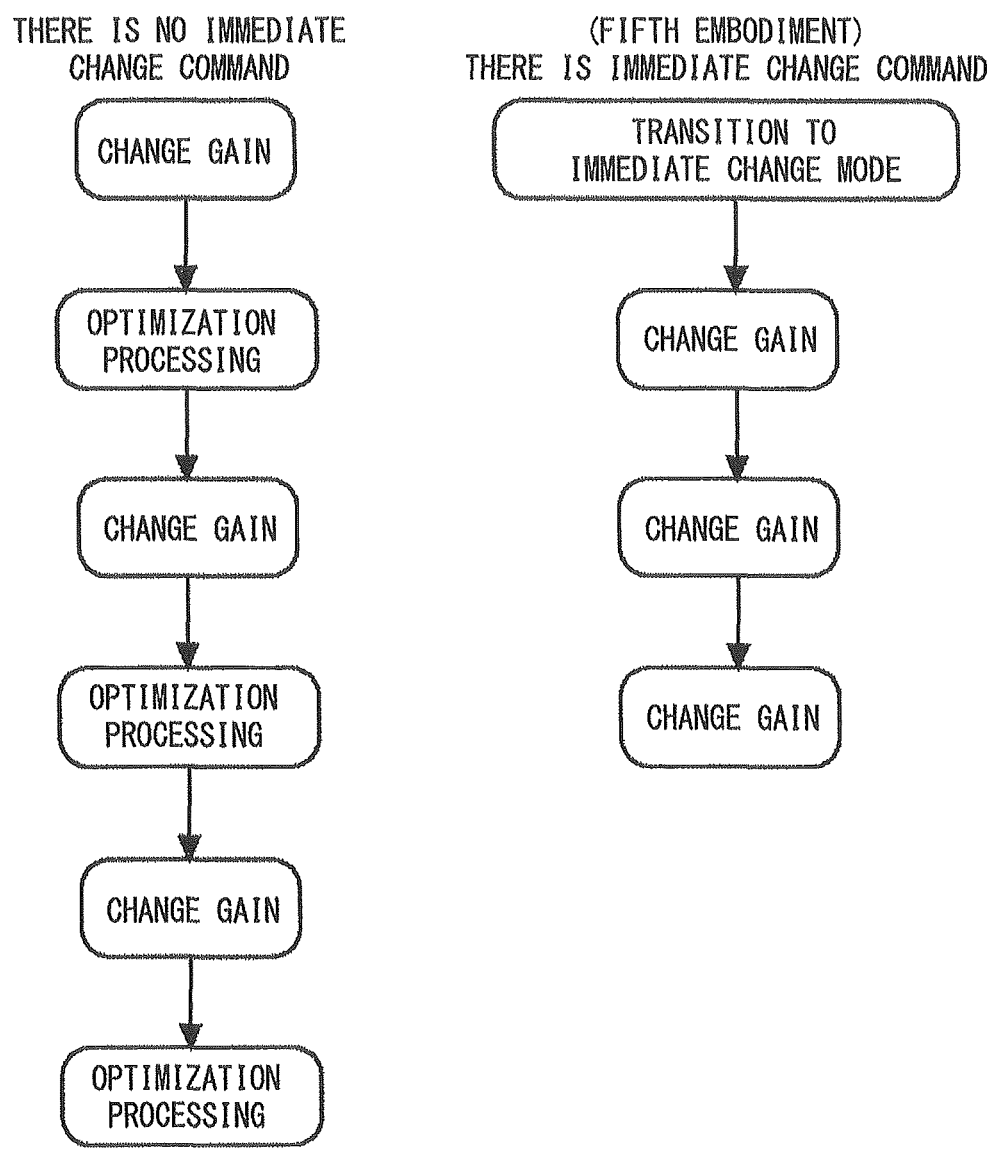
FIG. 23 is a view for explaining a difference between an operation of a semiconductor device according to the fifth embodiment and an operation of the semiconductor device according to the first embodiment.

As described above, by using the SPI interface 180a according to the fifth embodiment, as for the circuit change commands set to the immediate change group, it is possible to reflect changes in circuits in the AFE unit 100 without receiving all circuit configuration commands. Consequently, the semiconductor device 1 which has the SPI interface 180a according to the fifth embodiment can reduce, for example, a time required to change a gain. FIG. 23 illustrates a view for explaining an effect provided by the SPI interface 180a according to the fifth embodiment.

As illustrated in FIG. 23, when the SPI interface 180 is used, the execution order computation circuit 184 needs to perform optimization processing every time a gain or a reference value is changed. Meanwhile, when the SPI interface 180a is used, it is possible to continuously change a gain or a reference value without performing optimization processing.

Sixth Embodiment

Another mode of commands applied to a SPI interface 180a according to the fifth embodiment will be described in the sixth embodiment. More specifically, in the sixth embodiment, a command mode of switching whether to execute circuit change commands belonging to an immediate change group in an immediate change mode or to execute the circuit change commands after execution order optimization processing as in the first embodiment is added.

Figure 24:
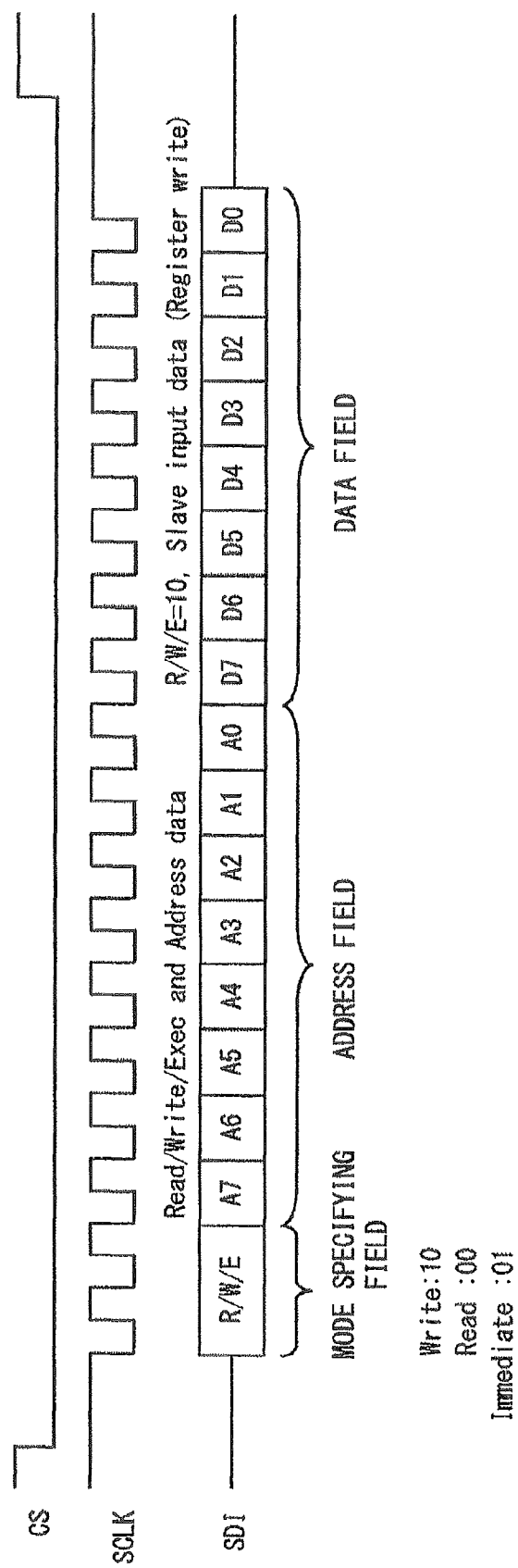
FIG. 24 is a timing chart for explaining a command for specifying an immediate execution mode according to a sixth embodiment.

Next, FIG. 24 illustrates a timing chart for explaining a command for specifying an immediate execution mode according to the sixth embodiment. As illustrated in FIG. 24, the command for specifying the immediate execution mode takes 01 in a mode specifying field of a circuit change command.

When it receives a circuit change command belonging to the immediate change group as a command for specifying the immediate execution mode, the SPI interface 180a causes a register group determination circuit 191, a mode switching register 192 and the like to function, and immediately executes the received circuit change command. Meanwhile, when it receives the circuit change command belonging to the immediate change group in a write mode, the SPI interface 180a places the register group determination circuit 191, the mode switching register 192 and the like in a disenable state, and executes circuit change commands received after execution order optimization processing similar to the other circuit change commands.

Further, when it receives the circuit change command which does not belong to the immediate change group as a command for specifying the immediate execution mode, the SPI interface 180a places the register group determination circuit 191, the mode switching register 192 and the like in the disenable state, and executes circuit change commands received after execution order optimization processing similar to the other circuit change commands.

As described above, by using a command for specifying the immediate execution mode according to the sixth embodiment, it is possible to switch whether to execute circuit change commands belonging to the immediate change group in the immediate execution mode or to execute the circuit change commands after the execution order optimization processing.

Seventh Embodiment

Another mode in case where a compiling device 10 described in the second embodiment executes compile processing with respect to a code file including circuit change commands belonging to an immediate change group illustrated in FIG. 22 will be described in the seventh embodiment. More specifically, a compiling device according to the seventh embodiment has an operation mode of not performing processing of optimizing a command execution order when only circuit change commands belonging to the immediate change group are included in a code file.

Figure 25:
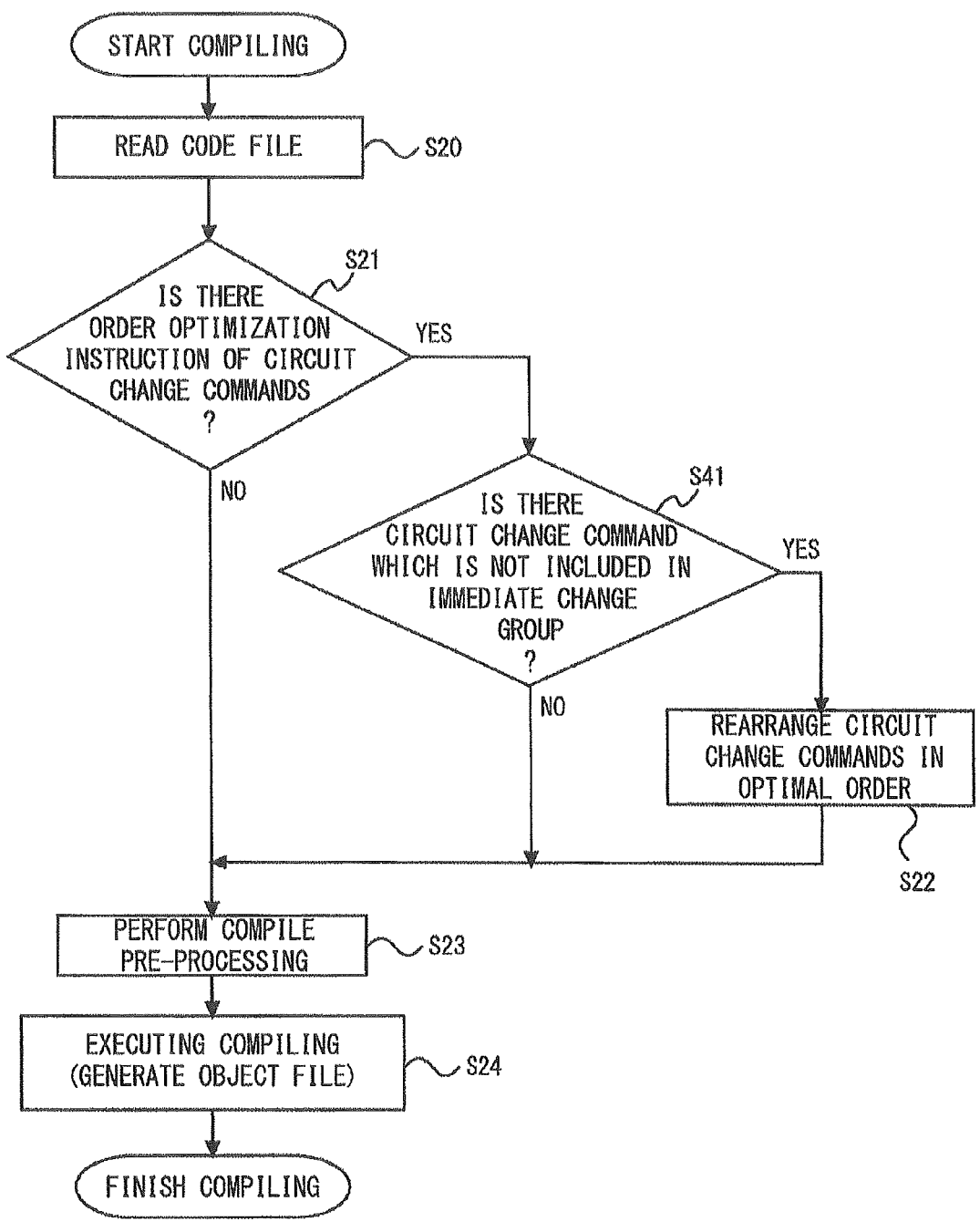
FIG. 25 is a flowchart illustrating compile processing according to a seventh embodiment.

FIG. 25 illustrates a flowchart illustrating an operation of the compiling device according to the seventh embodiment.

As illustrated in FIG. 25, the compiling device according to the seventh embodiment performs processing in step S41 in addition to an operation of the compiling device according to the second embodiment illustrated in FIG. 13. Step S41 is performed when there is an order optimization instruction of circuit change commands in step S21. In step S41, whether or not circuit change commands which are not included in the immediate change group are included in a code file is determined. Further, when it is determined in step S41 that there are circuit change commands which are not included in the immediate change group in the code file (a YES branch in step S41), the compiling device according to the seventh embodiment performs processing of optimizing circuit change commands (step S22). Meanwhile, when it is determined in step S41 that the circuit change commands in the code file are only circuit change commands included in the immediate change group (a NO branch in step 41), the compiling device according to the seventh embodiment performs compile pre-processing in step S23 without performing processing of optimizing the circuit change commands.

Figure 26:
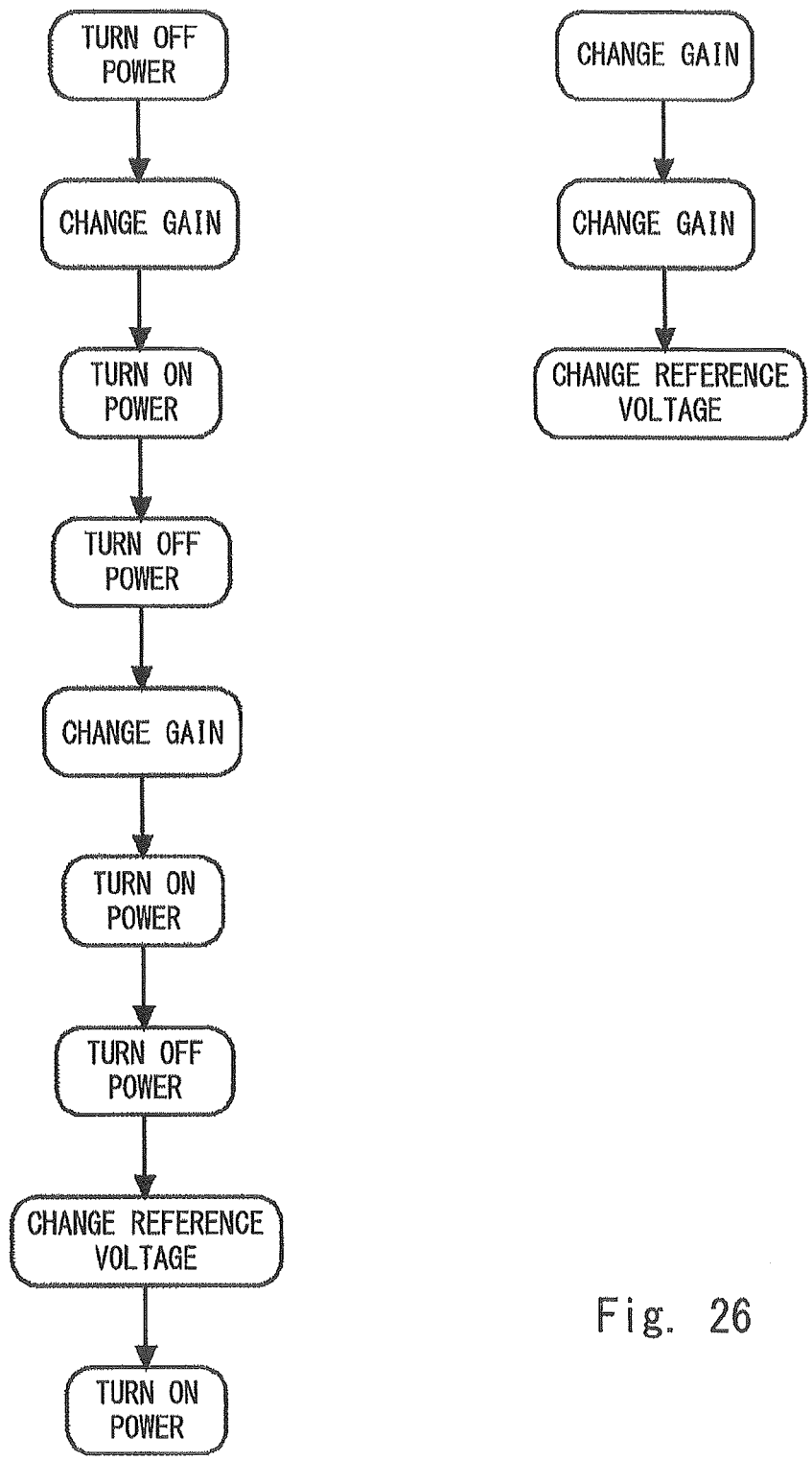
FIG. 26 is a view for explaining a difference between an operation of a compiling device according to the seventh embodiment and an operation of the compiling device according to the second embodiment.

As described above, by using the compiling device according to the seventh embodiment, it is possible to generate a code file which does not include power control commands for performing processing of switching on and off of power sources upon generation of the code file including commands for changing only a circuit configuration such as a gain, a reference value and the like. Further, by controlling the semiconductor device 1 based on the code file which does not include the power control commands, it is possible to switch a gain or switch a reference voltage at a high speed in the semiconductor device 1. FIG. 26 illustrates a view for explaining an operation of the semiconductor device 1 which operates based on the code file generated by the compiling device according to the seventh embodiment.

As illustrated in the left side in FIG. 26, when the semiconductor device 1 is controlled based on the code file generated by the compiling device according to the second embodiment, on and off of power sources are controlled every time a gain or a reference value is changed. Meanwhile, as illustrated in the right side in FIG. 26, when the semiconductor device 1 is controlled based on the code file generated by the compiling device according to the seventh embodiment, it is possible to continuously change a gain or a reference value without controlling on and off of power sources.

Eighth Embodiment

Another mode of a design support device according to the third embodiment will be described in the eighth embodiment. In the design support device according to the eighth embodiment, an immediate change button 25 is provided above a circuit custom window, and an operation mode of immediately reflecting a change in circuit parameters in an AFE unit 100 upon verification of an operation of the semiconductor device 1 is implemented.

Figure 27:
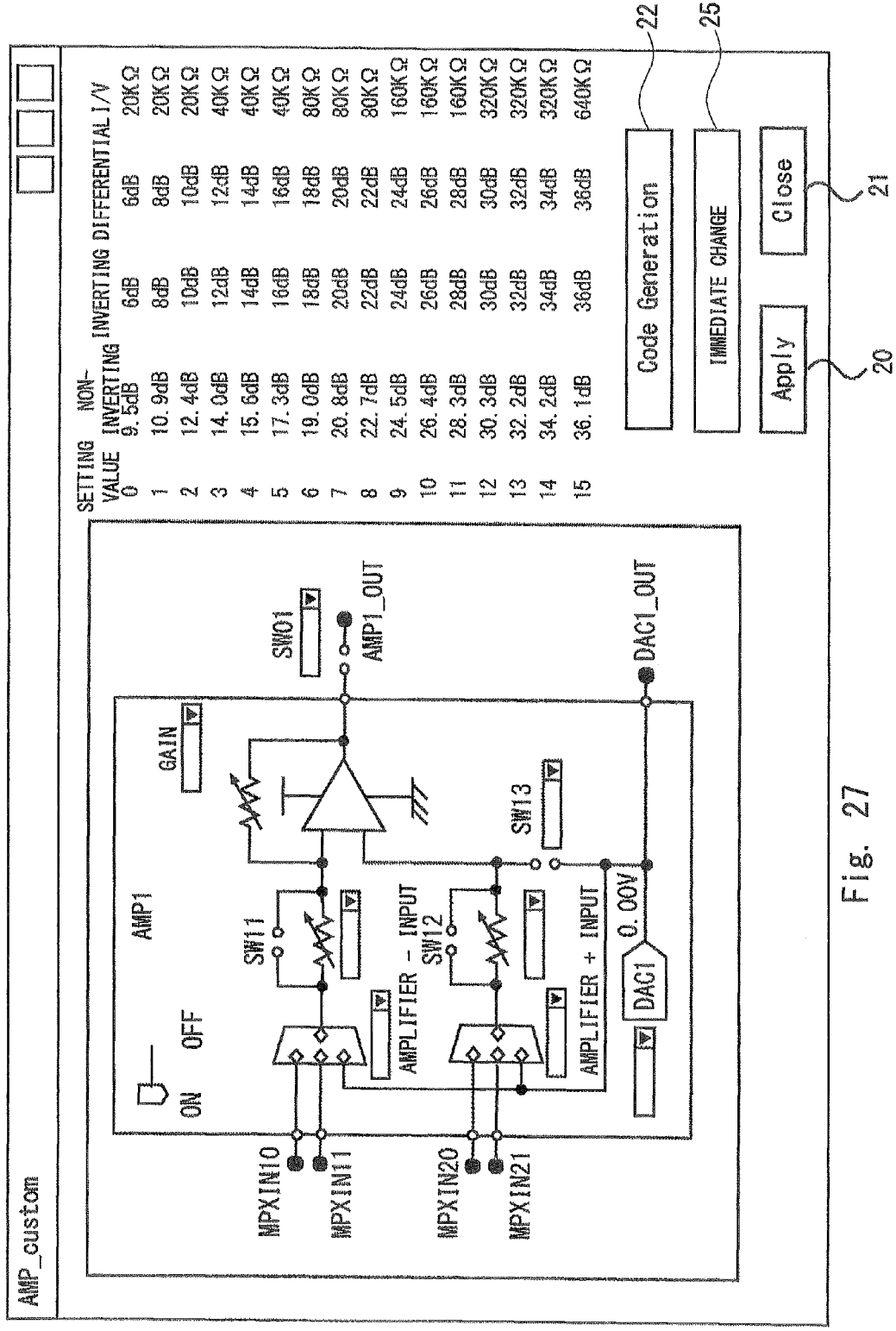
FIG. 27 is a view for explaining a register setting value check screen which is used in a design support device according to an eighth embodiment to check a setting status of circuit parameters.

FIG. 27 illustrates a view for explaining the circuit custom window displayed in the design support device according to the eighth embodiment. As illustrated in FIG. 27, the circuit custom window according to the eighth embodiment is configured by adding the immediate change button 25 to the circuit custom window described in the third embodiment.

Further, when the immediate change button 25 is pushed, the design support device according to the eighth embodiment restricts changeable circuit parameters to parameters corresponding to circuit change commands (e.g. circuit configuration setting commands) belonging to an immediate change group illustrated in FIG. 22. Furthermore, the design support device according to the eighth embodiment transmits the circuit change commands corresponding to the immediately changed circuit parameters to the AFE unit 100 in response to a change in the circuit parameters.

Figure 28:
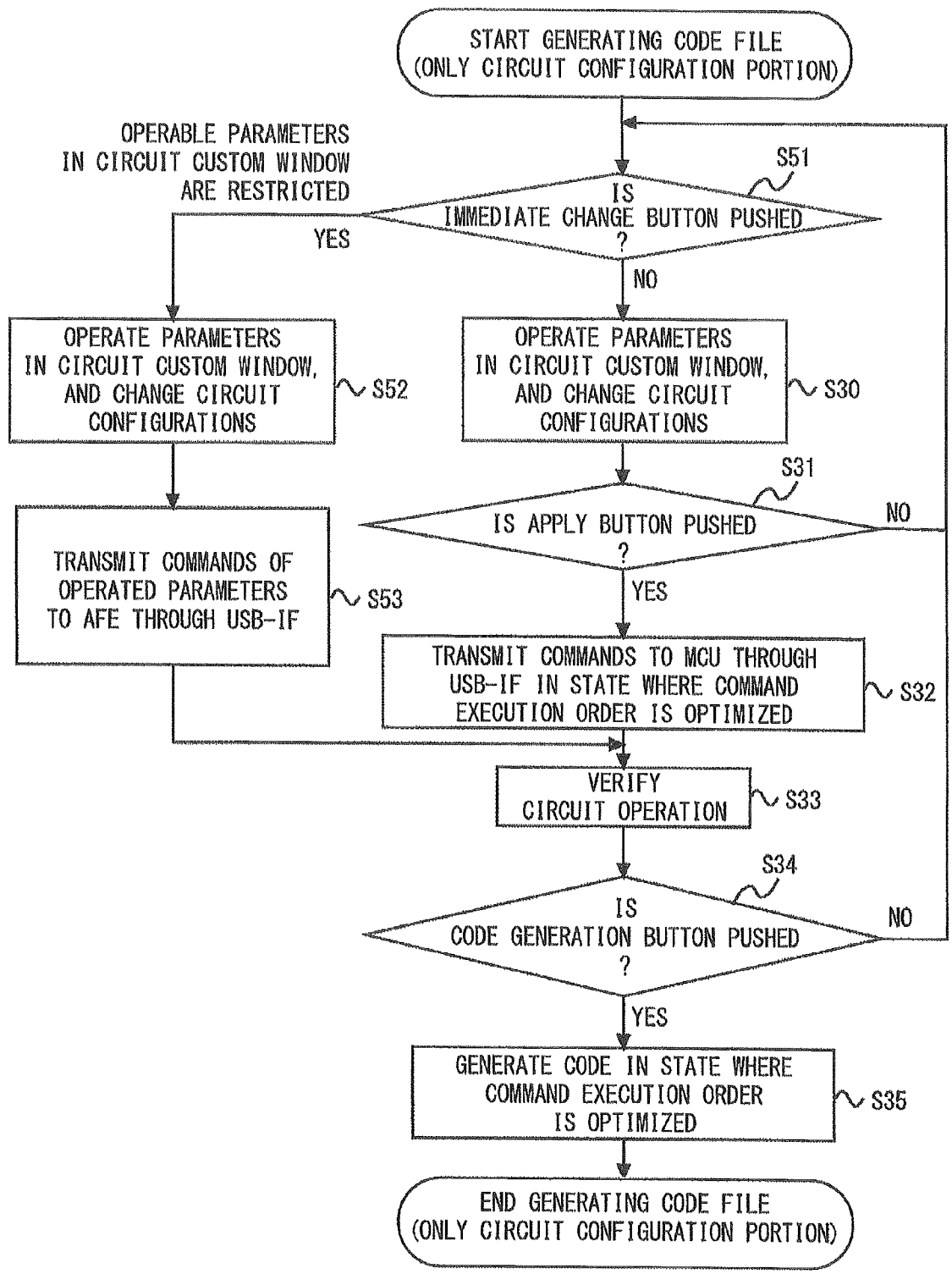
FIG. 28 is a flowchart of code file generation processing in the design support device according to the eighth embodiment.

Hereinafter, an operation of the design support device according to the eighth embodiment will be described. FIG. 28 illustrates a flowchart illustrating the operation of the design support device according to the eighth embodiment. As illustrated in FIG. 28, the design support device according to the eighth embodiment performs an operation of the design support device according to the third embodiment which is described with reference to FIG. 17 and processing in steps S51 to S54.

In step S51, whether or not the immediate change button 25 is pushed is determined. When it is determined in this step S51 that the immediate change button 25 is not pushed (a NO branch in step S51), the design support device according to the eighth embodiment performs the same operation as the operation of the design support device according to the third embodiment.

Meanwhile, when it is determined in this step S51 that the immediate change button 25 is pushed (a YES branch in step S51), the design support device restricts operable circuit parameters in the circuit custom window to parameters related to the circuit configuration setting commands. Further, the design support device according to the eighth embodiment receives a change in the changed circuit parameters (step S52). Subsequently, the design support device according to the eighth embodiment transmits the circuit change commands corresponding to the changed circuit parameters to the AFE unit 100 through a USB interface (step S53).

Subsequently, similar to the case where the design support device according to the third embodiment is used (step S33), a user verifies a circuit operation and generates a code file by pushing the code generation button 22 (steps S34 and S35).

As described above, in the design support device according to the eighth embodiment, the immediate change button 25 is mounted and changeable circuit parameters are restricted in response to pushing of the immediate change button 25 to prevent the user from erroneously operating parameters. Further, the design support device according to the eighth embodiment verifies circuits in a state where the immediate change button 25 is pushed, and, consequently, can easily perform verification and the like by sweeping a gain or a reference voltage.

The invention made by the inventors of the present application has been specifically described based on the embodiments. However, the present invention is not limited to the above-described embodiments and can be variously changed within a range which does not deviate from the scope of the invention.

The first to eighth embodiments can be combined as desirable by one of ordinary skill in the art.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A semiconductor device comprising:
an analog front end unit that includes a plurality of analog functional circuits, and a switch circuit group that switches circuit forms and circuit configurations of the plurality of analog functional circuits; and
a control circuit that receives a plurality of commands for specifying the circuit forms and the circuit configurations, and controls the switch circuit group based on the plurality of commands,
wherein the control circuit controls the switch circuit group in an order, set in advance without executing a received circuit change, different from an order of the received commands in response to reception of a command execution instruction defined as one of the plurality of commands.

2. The semiconductor device according to claim 1, wherein the control circuit executes the commands in an order of circuit form setting commands for specifying the circuit forms, circuit configuration setting commands for specifying the circuit configurations and power control commands for controlling power sources of the plurality of analog functional circuits irrespective of an order of the received commands.

3. The semiconductor device according to claim 1, wherein
the control circuit includes a plurality of registers whose addresses are defined according to an execution order of the commands,
the plurality of commands each include data for specifying a state of the switch circuit group and address values for specifying the registers in which the data is stored, and
the control circuit temporarily stores the commands in a reception order, and stores in the registers the data of the commands in an order of the address values included in the commands in response to reception of the command execution instruction.

4. The semiconductor device according to claim 3, wherein the control circuit includes write flags that are associated with the address values of the plurality of commands and that are placed in an enable state according to an input of the corresponding commands, and stores the temporarily stored commands in the plurality of registers in such a way that the address values associated with the write flags placed in the enable state are arranged in at least one of an ascending order or descending order.

5. The semiconductor device according to claim 1, wherein the control circuit stores in advance address values of circuit configuration setting commands for specifying the circuit configurations, and executes the received commands when the commands are determined as the circuit configuration setting commands based on the address values of the inputted commands.

6. The semiconductor device according to claim 5, wherein, when it receives an input of a command for specifying an immediate execution mode defined in advance and when it receives an input of the circuit configuration setting commands for specifying the circuit configurations, the control circuit immediately executes the inputted commands.

7. A design support device that outputs a code file for controlling a semiconductor device that comprises:
an analog front end unit that includes a plurality of analog functional circuits, and a switch circuit group that switches circuit forms and circuit configurations of the plurality of analog functional circuits; and a control circuit that receives a plurality of commands for specifying the circuit forms and the circuit configurations, and controls the switch circuit group based on the plurality of commands, wherein the design support device displays a GUI (Graphical User Interface) that displays changeable circuit parameters in the plurality of analog functional circuits, reserves the commands corresponding to the changed circuit parameters as correction target command codes, and generates the code file in which command codes including the correction target command codes are described in a certain order according to a generation command of the code file irrespectively of a reservation order of the correction target command code.

8. The design support device according to claim 7, wherein the design support device describes the correction target command codes in an order of circuit form setting commands for specifying the circuit forms, circuit configuration setting commands for specifying the circuit configurations and power control commands for controlling power sources of the plurality of analog functional circuits.

9. The design support device according to claim 7, wherein the design support device inserts command codes of power control commands for controlling power sources of the analog functional circuits prior to and subsequent to command codes corresponding to the circuit parameters described in the code file.

10. The design support device according to claim 7, wherein the design support device restricts the changeable circuit parameters to parameters corresponding to circuit configuration setting commands for specifying the circuit configurations in response to pushing of an immediate change button displayed on the GUI, and supplies command codes corresponding to the changed circuit parameters to the semiconductor device.

11. A non-transitory computer readable medium that stores a compiling program that outputs an object file to a semiconductor device that comprises:

an analog front end unit that includes a plurality of analog functional circuits, and a switch circuit group that switches circuit forms and circuit configurations of the plurality of analog functional circuits;

a control circuit that receives a plurality of commands for specifying the circuit forms and the circuit configurations, and controls the switch circuit group based on the plurality of commands, a computation circuit that executes the object file including the plurality of commands and outputs the plurality of commands to the control circuit, wherein the program includes reading a code file in which a program is described, detecting a plurality of command codes corresponding to the plurality of commands included in the code file, rearranging the plurality of detected command codes in a predetermined order, set in advance without executing a received circuit change, and generating the object file by performing compile processing on the code file including the plurality of command codes whose order is rearranged.

12. The non-transitory computer readable medium according to claim 11, wherein the compiling program includes rearranging the command codes in an order of circuit form setting commands for specifying the circuit forms, circuit configuration setting commands for specifying the circuit configurations and power control commands for controlling power sources of the plurality of analog functional circuits.

13. The non-transitory computer readable medium according to claim 11, wherein the compiling program includes inserting command codes of power control commands for controlling power sources of the analog functional circuits prior to and subsequent to the plurality of command codes detected in the code file, and executes the compile processing with respect to the code file including a command code of the power control command.

14. The non-transitory computer readable medium according to claim 11, wherein the compiling program includes executing the compile processing without rearranging the plurality of command codes when the plurality of command codes detected in the code file are only command codes belonging to an immediate change group defined in advance.

15. The semiconductor device according to claim 1, wherein the control circuit includes write flags that are associated with address values of the plurality of commands and that are placed in an enable state according to an input of the corresponding commands, and stores the temporarily stored commands in the plurality of registers in such a way that the address values associated with the write flags placed in the enable state are arranged in at least one of an ascending order or descending order.

16. The semiconductor device according to claim 1, wherein, when an input of a command is received for specifying an immediate execution mode defined in advance and when it receives an input of circuit configuration setting commands for specifying the circuit configurations, the control circuit immediately executes the inputted commands.

17. The semiconductor device according to claim 1, wherein the semiconductor device restricts changeable circuit parameters to parameters corresponding to circuit configuration setting commands for specifying the circuit configurations in response to pushing of an immediate change button displayed on the GUI (Graphical User Interface).

18. The design support device according to claim 7, wherein the design support device restricts the changeable circuit parameters to parameters corresponding to circuit configuration setting commands for specifying the circuit configurations in response to pushing of an immediate change button displayed on the GUI (Graphical User Interface).

19. The non-transitory computer readable medium according to claim 11, wherein the control circuit includes write flags that are associated with address values of the plurality of commands and that are placed in an enable state according to an input of the corresponding commands, and stores the temporarily stored commands in the plurality of registers in such a way that the address values associated with the write flags placed in the enable state are arranged in at least one of an ascending order or descending order.

20. The non-transitory computer readable medium according to claim 11, wherein, when an input of a command is received for specifying an immediate execution mode defined in advance and when it receives an input of circuit configuration setting commands for specifying the circuit configurations, the control circuit immediately executes the inputted commands.

* * * * *